(12) United States Patent
Yamaguchi et al.

(10) Patent No.: US 7,269,843 B2
(45) Date of Patent: Sep. 11, 2007

(54) BROADCASTING SYSTEM AND MEDIA PLAYER

(75) Inventors: Takehisa Yamaguchi, Ikoma (JP); Hideki Nagata, Kobe (JP); Akira Kawabata, Ikoma (JP); Masato Fujii, Nagaokakyo (JP); Yasuaki Serita, Sakai (JP); Yoshiyuki Tamai, Toyokawa (JP); Hiroshi Hatano, Takatsuki (JP); Yasumasa Sawai, Yamatotakada (JP); Kazuhiko Ishimaru, Kaizuka (JP)

(73) Assignee: Minolta Co., Ltd., Osaka (JP)

( * ) Notice: Subject to any disclaimer, the term of this patent is extended or adjusted under 35 U.S.C. 154(b) by 1206 days.

(21) Appl. No.: 09/839,231

(22) Filed: Apr. 23, 2001

(65) Prior Publication Data

US 2001/0036203 A1    Nov. 1, 2001

(30) Foreign Application Priority Data

Apr. 26, 2000 (JP) .......................... P2000-126360
May 19, 2000 (JP) .......................... P2000-147735

(51) Int. Cl.
*H04N 7/16* (2006.01)

(52) U.S. Cl. ............ 725/141; 725/153; 725/136; 725/80; 348/460; 348/552; 348/734

(58) Field of Classification Search ............ 725/80, 725/131, 132–133, 135–136, 139, 141, 151, 725/153, 74; 348/734, 460, 552
See application file for complete search history.

(56) References Cited

U.S. PATENT DOCUMENTS 5,255,313 A * 10/1993 Darbee .................. 379/102.01
6,097,441 A *  8/2000 Allport .................... 348/552
6,742,188 B1 *  5/2004 Del Castillo ............. 725/153

FOREIGN PATENT DOCUMENTS

| JP | 5-282279   | 10/1993 |
| JP | 7-68053    | 3/1995  |
| JP | 8-181954   | 7/1996  |
| JP | 9-215067   | 8/1997  |
| JP | 10-108144  | 4/1998  |
| JP | 11-187134  | 7/1999  |

OTHER PUBLICATIONS

"AV system controller 'RM-A2000'".
"Development of a wireless application which enables it to operate the function of each household electric appliances by a WAP (Wireless Application Protocol) browser".

* cited by examiner

*Primary Examiner*—Ngoc Vu
(74) *Attorney, Agent, or Firm*—McDermott Will & Emery LLP

(57) ABSTRACT

Broadcasting waves transmitted from a broadcasting device include operation control information for operating peripheral devices on a receiver side in accordance with the contents of a broadcast program in addition to broadcast data about said broadcast program. The receiver outputs the broadcast data to a display device, and transmits an operation command signal dependent on the operation control information to the peripheral devices to operate the peripheral devices in accordance with the contents of the broadcast program. As a result, an air conditioner raises or lowers room temperature and an illumination device blinks according to the progress of the program.

7 Claims, 22 Drawing Sheets

BROADCASTING SYSTEM AND MEDIA PLAYER

This application is based on applications Nos. 2000-126360 and 2000-147735 filed in Japan, the contents of which are hereby incorporated by reference.

BACKGROUND OF THE INVENTION

1. Field of the Invention

The present invention relates to a system in which a transmitter transmits a broadcast program and a receiver receives the broadcast program to reproduce the broadcast program. The present invention also relates to a system in which a player reproduces content recorded on recording media.

2. Description of the Background Art

There has been wide implementation of a technique for transmitting content such as video, voice and text by broadcasting or communication or for providing such content through recording media. The recording media include a CD-ROM, a DVD-RAM, a videotape and the like. A user uses a reproducing device such as a TV receiver or a player to reproduce the content.

On the other hand, there are often many electronic devices placed on the periphery of the reproducing device. The electronic devices include an air conditioner and a cooking device in homes. A remote controller for the reproducing device is also one kind of the peripheral electronic devices. In conventional systems, signals provided by broadcasting, communication or recording media represent data independent of such peripheral electronic devices. It is desired to more efficiently use the signals provided by broadcasting, communication or recording media.

In particular, the use of digital communication and broadcasting techniques enables more information to be transmitted by the use of data compression and the like. This allows not only the transmission of broadcast programs including video and voice but also the addition of other information to the broadcast programs, to achieve broadcasting of the combination of the broadcast programs and the additional information in the form of integrated digital content. In this respect, the digital communication and broadcasting techniques are expected to achieve information broadcasting services for a wider range of uses than conventional analog television broadcasting.

The use of digital broadcasting techniques provides a wide variety of services to the user through the information added to the broadcast programs, to allow the user to access the services by means of a receiver designed specifically for the access to the services.

The provision of the wide variety of services in accordance with the contents of the programs to the user requires the user to prepare receivers adaptable sufficiently to the services. However, it is inconvenient for the user to prepare a plurality of receivers in accordance with the services to be accessed.

SUMMARY OF THE INVENTION

The present invention is directed to a broadcasting system.

According to the present invention, the broadcasting system comprises: a) a broadcasting device for transmitting broadcasting waves; b) a receiver for receiving the broadcasting waves; and c) a peripheral device provided outside the receiver. The broadcasting device comprises a-1) a transmission controller for transmitting a combination of broadcast data about a broadcast program and an external control signal for controlling the peripheral device in accordance with contents of the broadcast program in the form of the broadcasting waves to the receiver, and the receiver comprises b-1) a receiver controller for receiving the broadcasting waves from the broadcasting device to output the broadcast data to a reproducer and to transmit a command signal dependent on the external control signal to the peripheral device, the peripheral device being controlled by the command signal.

In a preferred embodiment of the present invention, the peripheral device includes at least one of an illumination device, an air conditioner, a sound generator, and a remote controller for the receiver.

Preferably, the remote controller is controlled by the command signal, and the remote controller comprises: a control panel having a display device; and a control element for displaying an item dependent on the external control signal on the display device and for transmitting to the receiver an information signal responsive to an input operation to the control panel in accordance with the item.

Preferably, the transmission controller comprises: a multiplex element for multiplexing the broadcast data and the external control signal into the broadcasting waves for respective channels; and a multiplex signal transmission element for transmitting the broadcasting waves for the respective channels to the receiver.

The transmission controller may comprise: a clock element for clocking a broadcasting time of the broadcast program or elapsed time since start of broadcasting as a timing signal; and a switching signal transmission element for transmitting a switching signal for the display item on the control panel to the receiver, based on the timing signal. Correspondingly, the receiver controller may comprise a switching signal extraction element for extracting the switching signal from the broadcasting waves for a selected channel to transmit the switching signal to the remote controller, and the control element of the peripheral device may comprise a switching element for switching a first display item on the control panel to a second display item specified by the external control signal in response to the switching signal.

The present invention also provides respective devices included in the broadcasting system.

In an aspect of the present invention, provided is an apparatus for processing a software including content information representing content and control information for controlling a peripheral device in accordance with the content, the apparatus comprising: an output element for outputting a first signal dependent upon the content information included in the software to a reproduction device; and a transmission element for transmitting a second signal dependent upon the control information included in the software to the peripheral device.

The content information may include music information and/or video information, and the control information includes information for controlling an illumination device and/or a body-sonic generator provided as the peripheral device in synchronization with progress in reproducing the music information and/or the video information.

In a preferred embodiment of the present invention, the content information includes cooking information, and the control information includes information for controlling a cooking device provided as the peripheral device in accordance with progress in reproducing the cooking information.

The present invention also provides software adapted to the broadcasting system or the apparatus for reproducing the content of the software, and a storage medium capable of storing the software.

In another aspect of the present invention, provided is a digital device for use in a space in which a content reproduction device and a home electronic device are provided, the digital device comprising: a receiver for receiving a digital signal; an element for extracting a content signal from the digital signal to output the content signal to the content reproduction device; and an element for extracting a control signal for controlling the home electronic device from the digital signal to output the control signal to the home electronic device. The home electronic device operates in synchronization with reproduction of the content under control of the control signal.

In further another aspect of the present invention, a remote controller capable of controlling an audio- and/or visual-electronic device, comprises: a variable display; a receiver for receiving a control signal synchronized with reproduction of content in the audio- and/or visual-electronic device; and a controller for changing a display item produced on the variable display in response to the control signal.

It is therefore an object of the present invention to control a peripheral device while reproducing content.

It is another object of the present invention to control a peripheral device in accordance with content of a broadcast program or content reproduced from media.

It is still another object of the present invention to provide a technique for wide use of a variety of pieces of content provided through broadcasting waves without preparing a variety of types of receivers.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

There are a variety of exemplary applications of the present invention. Description will be given first on a basic configuration of a broadcast program transmitting/receiving system, and thereafter on the various exemplary applications thereof.

<1 Basic Configuration of Broadcast Program Transmitting/Receiving System>

<1.1 Basic Construction of Broadcast Program Transmitting/Receiving System>

Figure 1:
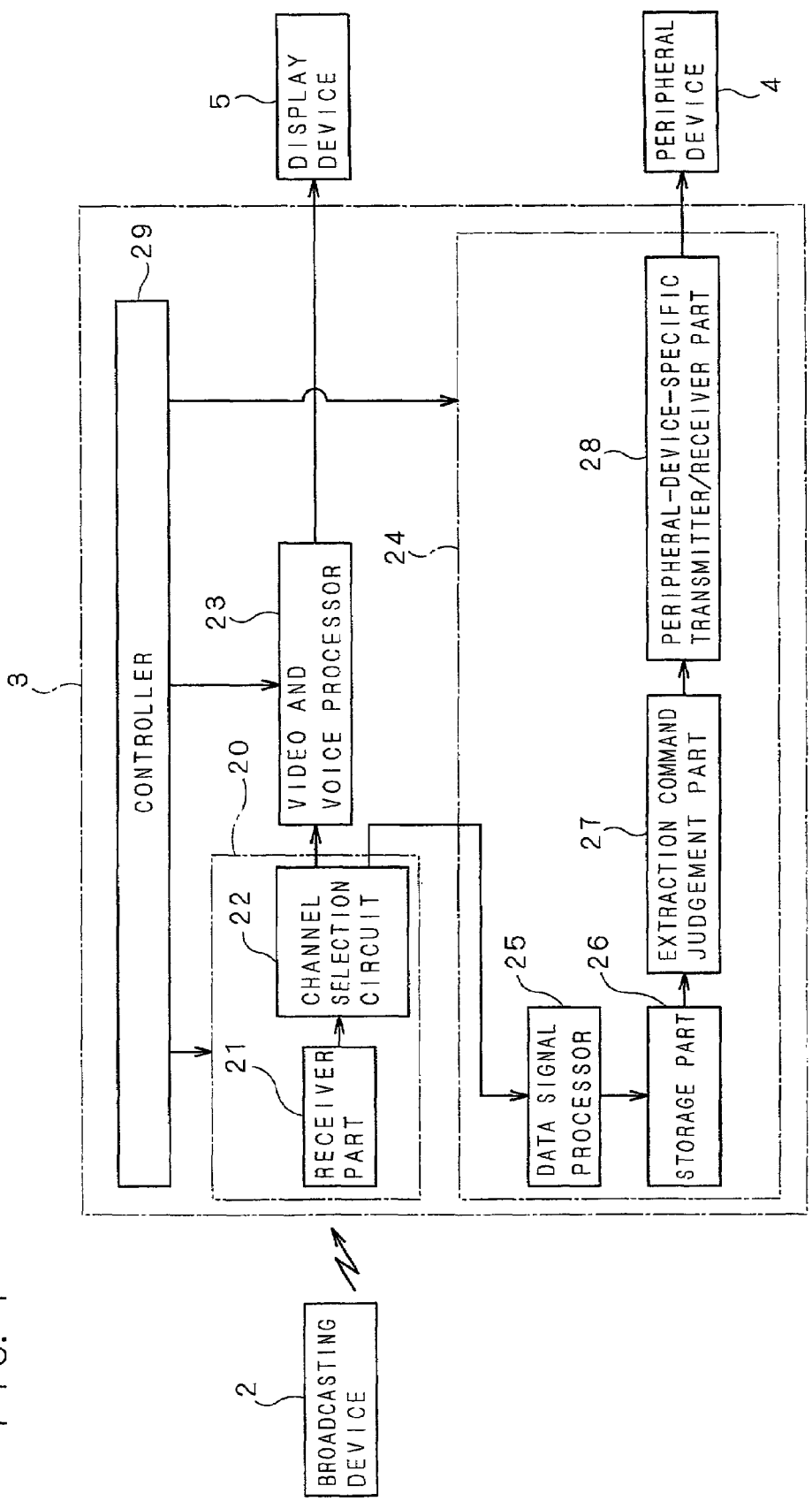
FIG. 1 is a block diagram of a broadcast program transmitting/receiving system according to a first preferred embodiment of the present invention.

With reference to FIG. 1, a broadcast program transmitting/receiving system according to a first preferred embodiment of the present invention comprises: a broadcasting device 2; a receiver 3; a display device 5 for displaying a broadcast program supplied in the form of broadcasting waves in a wired or wireless manner from the receiver 3; and a peripheral device 4 on the periphery of the receiver 3. Although only the single receiver 3 is shown in FIG. 1, there are actually a plurality of (generally a large number of) receivers 3 distributed because of the actual nature of the broadcasting system, each of the receivers 3 being capable of receiving the broadcasting waves from the broadcasting device 2. Each of the receivers 3 is accompanied by the display device 5 and the peripheral device 4.

Information transmitted from the broadcasting device 2 to the receiver 3 includes operation control information which specifies details of operation of the peripheral device 4 in accordance with the contents of the broadcast program and the like in addition to video information and voice information (broadcast data) about the broadcast program. The transmitted information is separated by the receiver 3 into the broadcast data and the operation control information. The broadcast data is outputted to the display device 5 and displayed as a television program including video and voice signals, whereas a peripheral device operation command signal dependent on the operation control information is transmitted through a communication cable, a wireless communication device and the like to the peripheral device 4.

The peripheral device 4 includes an illumination device, an air conditioner, a toy device, a cooking device and the like provided on the receiver 3 (viewer) side, which will be described later with respect to exemplary applications. The peripheral device 4 performs a predetermined operation based on the peripheral device operation command signal transmitted from the receiver 3.

<1.1.1 Broadcasting Device>

Figure 2:
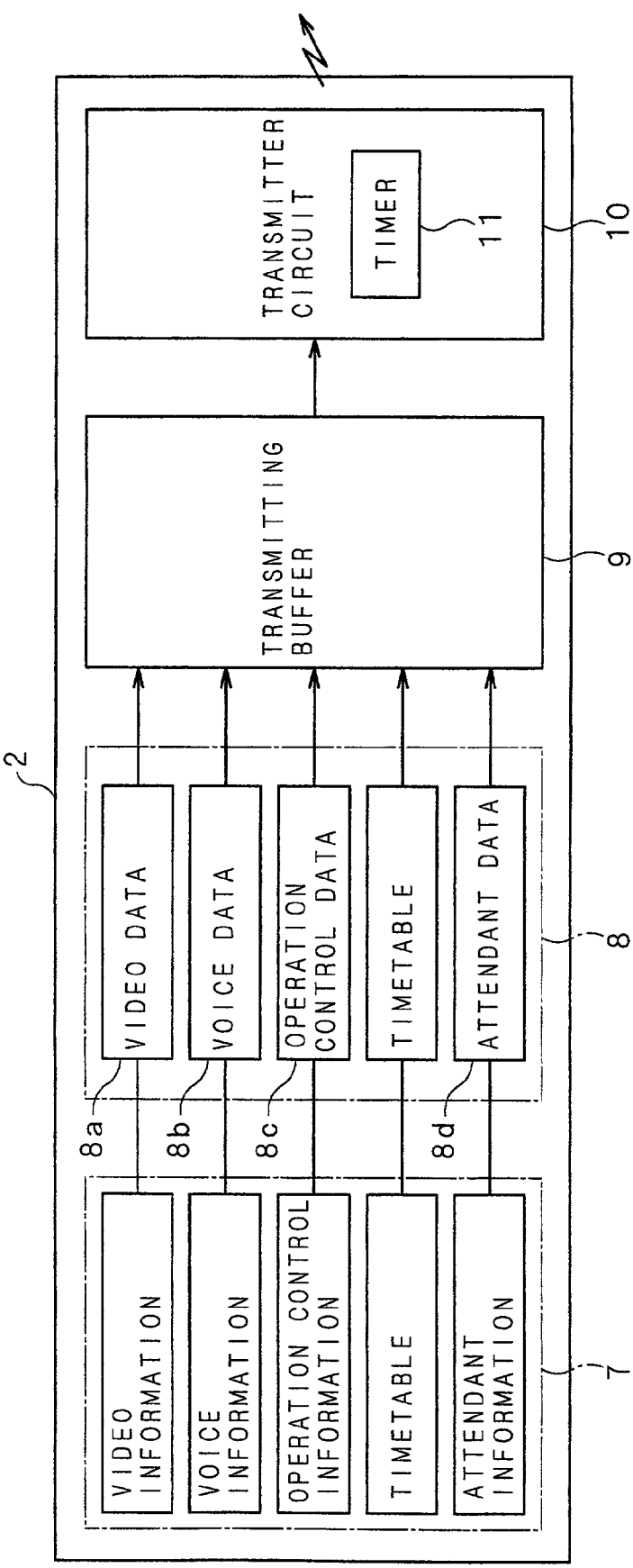
FIG. 2 is a block diagram of a broadcasting device of the broadcast program transmitting/receiving system of FIG. 1.

With reference to FIG. 2, the broadcasting device 2 comprises: an information source 7 of various types of information including the broadcast program and its associated information; a transmission information encoder 8 for format conversion of the various types of information from the information source 7; a transmitting buffer 9 for temporarily storing the various types of information outputted from the transmission information encoder 8; and a transmitter circuit 10 for transmitting and outputting the information stored in the transmitting buffer 9.

The information source 7 serves as various materials to be used for production of programs in the broadcasting device 2. The information source 7 includes video information and voice information which constitute the broadcast program itself, operation control information for operating the peripheral device 4 in accordance with the contents of the broadcast program, a timetable, and other attendant information.

The operation control information includes operation data which specifies the details of operation of at least the peripheral device 4. Depending on the details of operation, the operation control information includes voice data and the like, as required (see an exemplary application shown in FIG. 9 to be described later). Further, when the broadcast program transmitting/receiving system employs a plurality of types of peripheral devices 4, the operation control information includes designation data for designating a peripheral device 4 to be operated.

Other information such as textual information, if any, to be transmitted in addition to the video information, the voice information, the operation control information and a control panel display switching command signal is prepared and held as the attendant information in the information source 7.

Figure 3:
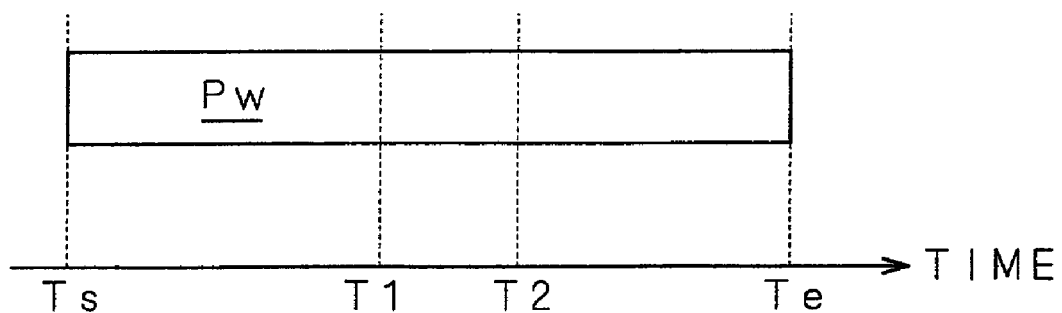
FIG. 3 illustrates a timetable established in the broadcasting device.

The timetable specifies a progress schedule of the broadcast program in the form of an array of time information, and the timing of transmission of each operation control information in corresponding relation to the progress schedule. For example, as shown in FIG. 3, when operating the peripheral device 4 over a time period from time T1 to time T2 after the start of broadcasting in the entire story of a broadcast program Pw which starts at time Ts and ends at time Te, the timing is specified so that the operation control information is transmitted during the time period between the times T1 and T2. During the time period between the times T1 and T2, the operation control information may be transmitted only at the time T1 at the beginning of the time period or may be repeatedly or periodically transmitted at regular time intervals. The former may be used when the peripheral device 4 which starts the operation at some midpoint of the program creates inconvenience for a viewer starting to watch the program at some midpoint between the times T1 and T2; and the latter may be used when such inconvenience is not caused.

Further, the operation control information may include time data about start and end times (defined with reference to, for example, the program broadcasting start time T1) of the operation as well as the operation data which specifies the details of operation of the peripheral device 4, and may be transmitted at the program start time Ts or repeatedly at regular time intervals during the program broadcasting time between Ts and Te. In this case, the receiver 3 controls the start and end times of the operation of the peripheral device 4, based on the time data.

The timetable also specifies a time when to transmit other to-be-transmitted attendant information, if any.

In accordance with the timetable, the transmission information encoder 8 reads the video information and the voice information which serve as the broadcast data about the broadcast program, the operation control information and the attendant information from the information source 7 to perform required digital signal processing on the read information. Then, the transmission information encoder 8 converts the video information, the voice information, the operation control information and the attendant information into video data 8a, voice data 8b, operation control data 8c and attendant data 8d having predetermined data formats, respectively, to transmit the data 8a, 8b, 8c and 8d to the transmitting buffer 9.

The transmitter circuit 10 comprises a timer 11 (clocking element), and suitably reads the video data 8a and the voice data 8b from the transmitting buffer 9 in accordance with the timing as specified in the timetable stored in the transmitting buffer 9, based on the clocking in the timer 11. Similarly, the transmitter circuit 10 suitably reads the operation control data 8c and the attendant data 8d from the transmitting buffer 9 in accordance with the timing as specified in the timetable, based on the clocking in the timer 11. The transmitter circuit 10 modulates these data 8a to 8d by a scheme suitable for a broadcasting system (e.g., terrestrial broadcasting, communication satellite broadcasting, cable TV, or Internet TV) to which the broadcasting device 2 conforms, and transmits and outputs the modulated data in the form of broadcasting waves.

Figure 4:
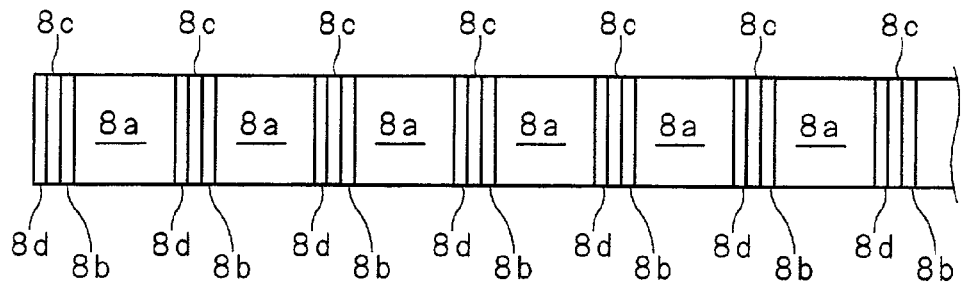
FIG. 4 shows an example of formats of multiplexed data to be transmitted from the broadcasting device to a receiver.

The broadcasting waves employed herein include multiplex communication waves outputted by multiplexing a plurality of types of data such as the video data 8a, the voice data 8b, the operation control data 8c and the attendant data 8d. The multiplexing of the data may be performed, for example, by a time division multiplex scheme for transmitting a plurality of types of data by using successive time intervals as shown in FIG. 4 or by a frequency multiplex scheme for transmitting a plurality of data at different frequencies. The clocking of the timer 11 may be performed in accordance with the broadcasting time (broadcasting schedule) of the broadcast program or with reference to elapsed time since the start of broadcasting.

The contents of the broadcasting waves to be transmitted from the broadcasting device 2 to the receiver 3 may be produced by combining data in the broadcasting device 2 as in this preferred embodiment or may be obtained by inputting an external combined signal to the broadcasting device 2.

<1.1.2 Receiver>

The receiver 3 which is placed in ordinary homes receives the broadcasting waves transmitted from the broadcasting device 2 to reproduce the broadcast program and the like on the display device 5. The receiver 3 is constructed as a single electronic unit, for example, known as a set-top box (STB).

Referring again to FIG. 1, the receiver 3 comprises: a receiving and channel selecting part 20 for receiving the broadcasting waves to separate the broadcasting waves into the video and voice data 8a, 8b and the operation control data 8c; a video and voice processor (output element) 23 for performing predetermined processing on the video data 8a and the voice data 8b to output the processed data 8a and 8b to the display device 5; a transmission processor 24 for transmitting a peripheral device operation command signal dependent on the operation control data 8c to the peripheral device 4; and a controller 29 for controlling the entire receiver 3 including the transmission processor 24.

The receiving and channel selecting part 20 comprises a receiver part 21 for receiving the broadcasting waves transmitted from the broadcasting device 2, and a channel selection circuit (channel-selection element or separation element) 22. The channel selection circuit 22 has both the function of extracting (or channel-selecting) part of the video and voice data 8a and 8b included in a broadcasting wave for a channel designated by the use of a predetermined input device from the broadcasting waves received by the receiver part 21, and the function of separately extracting the video and voice data 8a, 8b and the operation control data 8c when the operation control data 8c is included in the broadcasting wave for the same selected channel.

The video and voice processor 23 separately demodulates parts of the video and voice data 8a and 8b channel-selected and separated by the channel selection circuit 22 to recover the original video information and the original voice information, and outputs the original video and voice information to the display device 5. The display device 5 performs predetermined signal processing on the video information supplied from the video and voice processor 23 of the receiver 3 to display the video on a built-in CRT (Cathode Ray Tube), LCD (Liquid Crystal Display) panel or the like, and amplifies the voice information supplied from the video and voice processor 23 of the receiver 3 to output the amplified voice to an built-in loudspeaker.

The transmission processor 24 comprises a data signal processor 25, a storage part 26, an extraction command judgement part 27, and a peripheral-device-specific transmitter/receiver part 28.

The data signal processor 25 demodulates the operation control data 8c channel-selected and separated by the channel selection circuit 22 and the attendant data 8d to recover the original operation control information and the original attendant information. The storage part 26 stores all of the information demodulated by the data signal processor 25.

The extraction command judgement part 27 extracts required operation control information from the information stored in the storage part 26, and transmits a peripheral device operation command signal dependent on the extracted operation control information through the peripheral-device-specific transmitter/receiver part 28 to the peripheral device 4. The peripheral device operation command signal dependent on the operation control information termed herein means i) a signal produced based on only the operation control information, and ii) a signal produced based on: a predetermined table previously stored in the storage part of the receiver 3; and information obtained through the peripheral-device-specific transmitter/receiver part 28 from the peripheral device 4, in addition to the operation control information. The situation will be described in detail later with respect to exemplary applications.

The peripheral-device-specific transmitter/receiver part 28 is capable of intercommunication with the peripheral device 4, based on wired communication standards such as IEEE 1394 or wireless communication standards.

<1.1.3 Peripheral Device>

Figure 5:
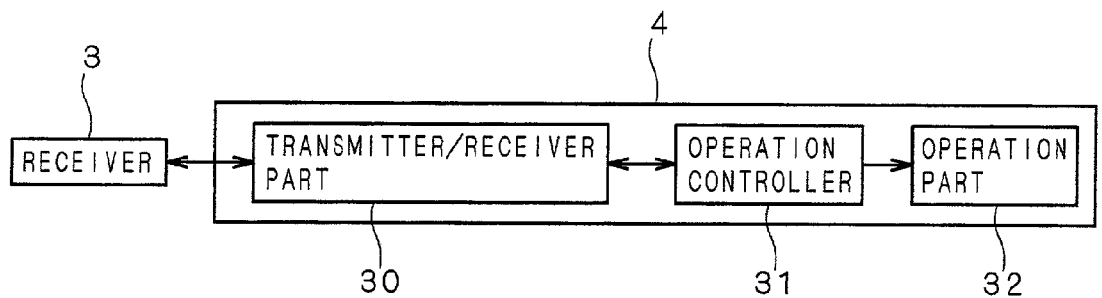
FIG. 5 is a block diagram of a peripheral device.

Examples of the peripheral device 4 include various devices which perform respective own operations, such as an illumination device, an air conditioner, a sound generator, a toy device, a remote controller of the receiver 3, and a cooking device provided in ordinary homes on the receiver 3 side, except a device for reproducing the broadcast program itself such as the display device 5. With reference to FIG. 5, the peripheral device 4 typically comprises: an operation part 32 for performing an own operation for controlling illumination, room temperature and humidity, generating a sound, or the like; a transmitter/receiver part 30 capable of intercommunication with the peripheral-device-specific transmitter/receiver part 28 of the receiver 3; and an operation controller 31 for controlling the operation of the operation part 32.

The transmitter/receiver part 30 receives the peripheral device operation command signal transmitted from the receiver 3 to transmit the peripheral device operation command signal to the operation controller 31. The operation controller 31 controls the operation part 32 in accordance with the peripheral device operation command signal.

The transmitter/receiver part 30 of the peripheral device 4 is capable of intercommunication with the peripheral-device-specific transmitter/receiver part 28 of the receiver 3. This allows information generated in the peripheral device 4 to be transmitted through the transmitter/receiver part 30 to the receiver 3.

The peripheral devices 4 are home electronic devices. These devices 4 are capable operating in any one of (i) a first operating mode for operating independently of a broadcast signal, and (ii) a second operating mode for operating as a peripheral effector device for a content reproduction device in accordance with a control signal from the receiver 3. For example, an illumination device functions as a conventional lamp in the first operating mode in which the illumination device does not receive the control signal from the receiver 3. In the second operating mode in which the illumination device receives the control signal from the receiver 3, the illumination device changes its brightness according to the progress of the broadcast program.

<1.2 Operation>

Description will be given on the operation of the broadcast program transmitting/receiving system of the above-mentioned construction.

First, in the broadcasting device 2, the video information, the voice information, the operation control information and the attendant information to be used for production of a desired program are selected from various materials in the information source 7, as shown in FIG. 2, and the timetable is produced which specifies the time when to transmit and output each of the video information, the voice information, the operation control information and the attendant information.

Next, the transmission information encoder 8 reads the operation control information and the attendant information in addition to the video information and the voice information serving as the broadcast program from the information source 7, performs required digital signal processing on the information, and converts the video information, the voice information, the operation control information and the attendant information into the video data 8a, the voice data 8b, the operation control data 8c and the attendant data 8d having predetermined data formats, respectively. The format of the timetable is maintained.

The video data 8a, the voice data 8b, the operation control data 8c, the attendant data 8d, and the timetable which are obtained in the transmission information encoder 8 are temporarily stored in the transmitting buffer 9, and thereafter are read out suitably to the transmitter circuit 10 in timed relation as specified in the timetable, based on the clocking of the timer 11 in the transmitter circuit 10. The transmitter circuit 10 modulates these data 8a, 8b, 8c and 8d by a scheme suitable for a broadcasting system to which the transmitter circuit 10 conforms, and transmits and outputs multiplexed broadcasting waves (see FIG. 4).

The broadcasting waves transmitted from the broadcasting device 2 in this manner are received by the receiver part 21 of the receiver 3 placed in ordinary homes. The channel selection circuit 22 separates the broadcasting waves received by the receiver part 21 into the video data 8a, the voice data 8b, the operation control data 8c and the attendant data 8d.

The video data 8a and the voice data 8b are outputted to the video and voice processor 23. The video and voice processor 23 separately demodulates the video data 8a and the voice data 8b to recover the original video information and the original voice information which in turn are outputted to the display device 5. Thus, a channel-selected broadcast program is displayed on the display device 5.

On the other hand, the operation control data 8c and the attendant data 8d are outputted to the data signal processor 25. The data signal processor 25 demodulates the operation control data 8c and the attendant data 8d to recover the original operation control information and the original attendant information which in turn are stored in the storage part 26.

The extraction command judgement part 27 extracts the operation control information from the storage part 26, and transmits the peripheral device operation command signal dependent on the operation control information through the peripheral-device-specific transmitter/receiver part 28 to the peripheral device 4.

Upon receipt of the peripheral device operation command signal, the transmitter/receiver part 30 in the peripheral device 4 provides the peripheral device operation command signal to the operation controller 31. Thus, the operation controller 31 controls the operation of the operation part 32 in response to the peripheral device operation command signal.

This causes the peripheral device 4 to perform an operation in accordance with the broadcast program reproduced by the display device 5.

In the broadcast program transmitting/receiving system constructed as mentioned above, the broadcasting device 2 transmits the broadcasting waves including the operation control information for effecting the operation of the peripheral device 4 in accordance with the contents of the broadcast program in addition to the broadcast data (the video information and the voice information) about the broadcast program. The receiver 3 outputs the broadcast data (the video information and the voice information) included in the broadcasting waves to the display device 5, and transmits the peripheral device operation command signal dependent on the operation control information also included in the broadcasting waves to the peripheral device 4, thereby to cause the peripheral device 4 to perform the operation responsive to the peripheral device operation command signal. This allows the peripheral device 4 to operate in accordance with the broadcast program.

<2. Exemplary Applications>

Description will be given on more specific applications of the broadcast program transmitting/receiving system constructed as mentioned above.

<2.1 Exemplary Application of First Type>

<2.1.1 First Exemplary Application of First Type>

Figure 6:
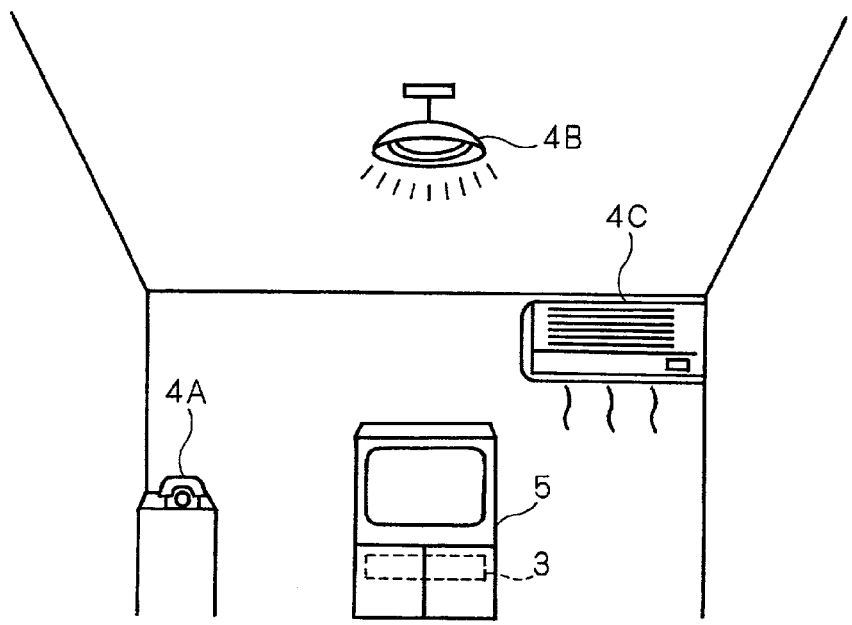
FIG. 6 is a perspective view of an exemplary application of the broadcast program transmitting/receiving system.
Figure 7:
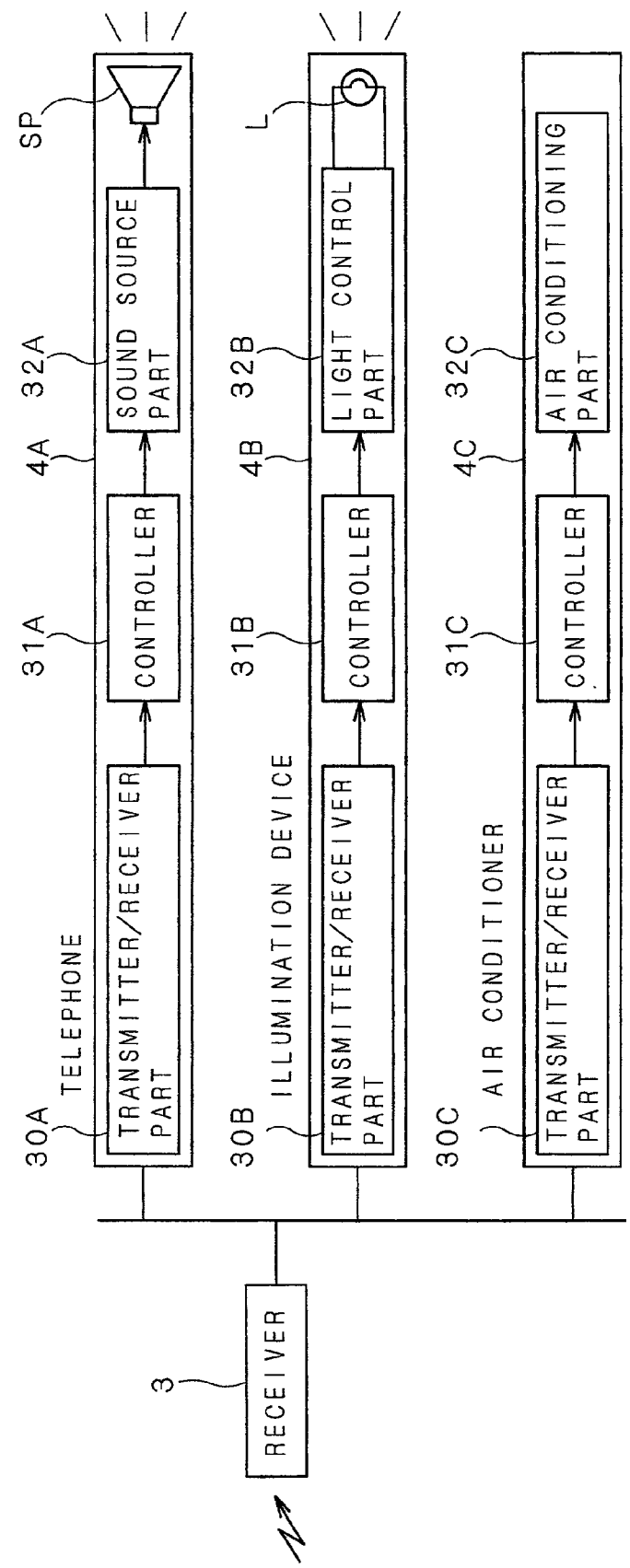
FIG. 7 is a block diagram of the receiver and peripheral devices in the exemplary application of FIG. 6.

In a first exemplary application, a telephone 4A functioning as a sound generator, an illumination device 4B suspended from the ceiling in the interior of a room, and an air conditioner 4C are used as the peripheral devices 4, as illustrated in FIGS. 6 and 7.

The telephone 4A comprises: a sound source part 32A for generating a ringing tone through a loudspeaker SP to the exterior; a transmitter/receiver part 30A capable of communicating with the receiver 3; and a controller 31A for controlling the sound source part 32A based on an operation command signal received by the transmitter/receiver part 30A.

In this case, when the broadcasting waves include the operation control information including designation data for designating the telephone 4A and operation data indicative of operating the telephone 4A to generate the ringing tone, the receiver 3 transmits the operation command signal dependent on the operation control information to the telephone 4A. This operation command signal is provided through the transmitter/receiver part 30A to the controller 31A which in turn controls the sound source part 32A to generate the ringing tone.

With the telephone 4A thus provided as the peripheral device 4, if there is, for example, a scene in which a telephone rings in the broadcast program, the operation control information indicative of ringing a telephone in addition to the broadcast data about the scene may be transmitted to the receiver 3 to actually ring the telephone 4A in ordinary homes on the receiver 3 side. This increases a sense of realism of the scene.

The illumination device 4B comprises a light control part 32B for controlling the brightness (or intensity) of a lamp L such as a fluorescent lamp; a transmitter/receiver part 30B capable of communicating with the receiver 3; and a controller 31B for controlling the light control part 32B based on an operation command signal received by the transmitter/receiver part 30B.

In this case, when the broadcasting waves include the operation control information including designation data for designating the illumination device 4B and operation data indicative of operating the illumination device 4B to control the interior of the room to a predetermined brightness, the receiver 3 transmits the operation command signal dependent on the operation control information to the illumination device 4B. The operation command signal is provided through the transmitter/receiver part 30B to the controller 31B which in turn controls the light control part 32B to adjust the brightness of the lamp L.

With the illumination device 4B thus provided as the peripheral device 4, if there is a scene in which the brightness of the interior of the room is to be controlled (e.g., a horror scene in which a ghost or a bogy appears) in the broadcast program, the operation control information indicative of controlling the illumination light of the lamp L (dimming or switching off the lamp L in the horror scene) in addition to the broadcast data about the scene may be transmitted to the receiver 3 to actually control the brightness of the lamp L of the illumination device 4B in ordinary homes on the receiver 3 side. This increases a sense of realism (a sense of horror) of the scene.

The illumination device 4B used herein may be of the type in which red, green and blue are combined to produce various colors, and may change the color of the illumination light in the room in accordance with the contents of the broadcast program.

The air conditioner 4C comprises an air conditioning part 32C for controlling room temperature, humidity and the quantity of air; a transmitter/receiver part 30C capable of communicating with the receiver 3; and a controller 31C for controlling the air conditioning part 32C based on an operation command signal received by the transmitter/receiver part 30C.

In this case, when the broadcasting waves include the operation control information including designation data for designating the air conditioner 4C and operation data indicative of operating the air conditioner 4C to control the room temperature, humidity and the quantity of air to predetermined levels, the receiver 3 transmits the operation command signal dependent on the operation control information to the air conditioner 4C. The operation command signal is provided through the transmitter/receiver part 30C to the controller 31C which in turn controls the room temperature, the humidity and the quantity of air.

With the air conditioner 4C thus provided as the peripheral device 4, if there is a scene in which room temperature, humidity and the quantity of air are to be controlled (e.g., a scene of a cold region such as Arctic, Antarctic and snowy regions, and a scene of a hot region such as southern countries) in the broadcast program, the operation control information indicative of controlling the room temperature, the humidity and the quantity of air (lowering the room temperature in the scene of the cold region and raising the room temperature in the scene of the hot region) in addition to the broadcast data about the scene may be transmitted to the receiver 3 to actually operating the air conditioner 4C to control the room temperature, the humidity and the quantity of air (to lower the room temperature in the scene of the cold region and to raise the room temperature in the scene of the hot region) in ordinary homes on the receiver 3 side. This increases a sense of realism of the scene.

<2.1.2 Second Exemplary Application of First Type>

In a second exemplary application, examples in which a toy is used as the peripheral device 4 will be described.

Figure 8:
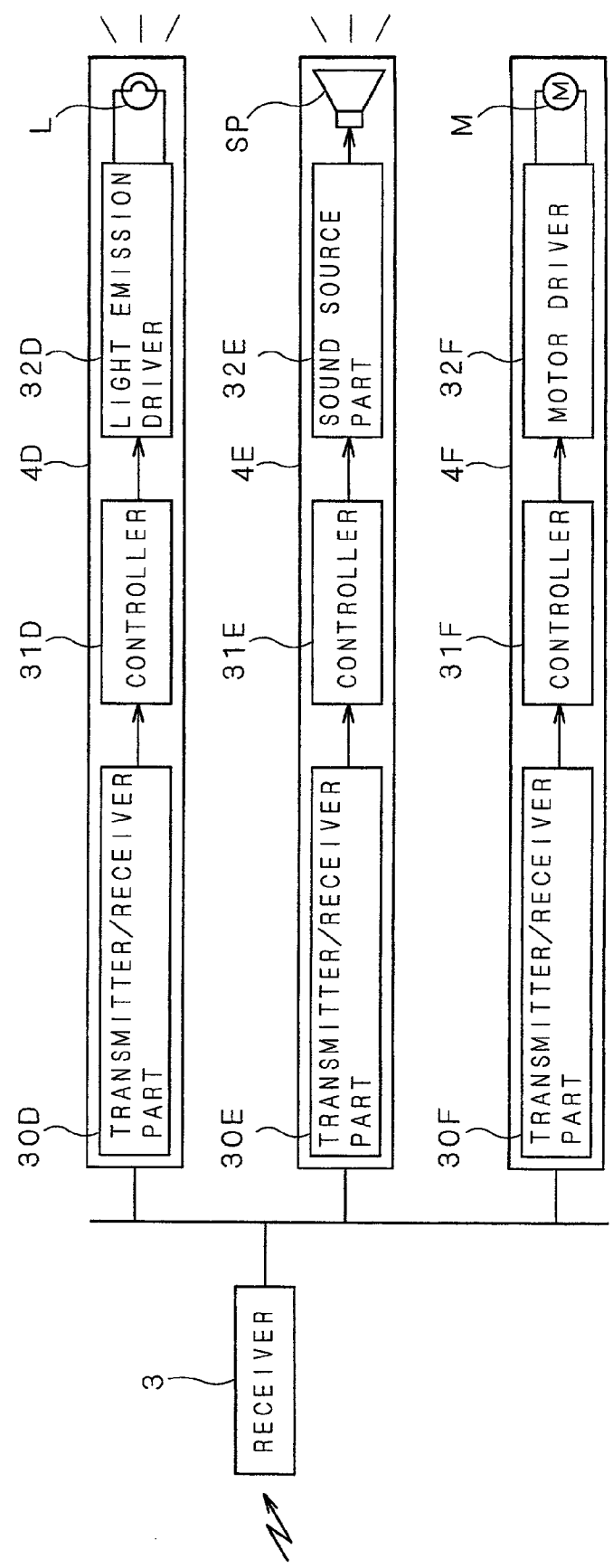
FIG. 8 is a block diagram of another exemplary application of the broadcast program transmitting/receiving system.

In the example shown in FIG. 8, a toy 4D having a light emitting part, a toy 4E which generates a sound, and a movable toy 4F are used as the peripheral devices 4.

The toy 4D having the light emitting part is assumed to be, for example, an imitation of a character who takes an active part in a broadcast program and who has a cane caused to glow. The sound generating toy 4E is assumed to be, for example, an imitation of a character who takes an active part in a broadcast program and who can voice or speak his/her constant refrain. The movable toy 4F is assumed to be, for example, an imitation of a character who takes an active part in a broadcast program and who wears a belt equipped with a rotatable miniature windmill.

The toy 4D comprises a light emission driver 32D for driving the lamp L of the cane or the like to emit light, a transmitter/receiver part 30D capable of communicating with the receiver 3, and a controller 31D for controlling the light emission driver 32D based on an operation command signal received by the transmitter/receiver part 30D. The toy 4E comprises a sound source part 32E for emitting the predetermined constant refrain through a loudspeaker SP, a transmitter/receiver part 30E capable of communicating with the receiver 3, and a controller 31E for controlling the sound source part 32E based on an operation command signal received by the transmitter/receiver part 30E. The toy 4F comprises a motor driver 32F for driving a motor M to rotate the windmill of the belt, a transmitter/receiver part 30F capable of communicating with the receiver 3, and a controller 31F for controlling the motor driver 32F based on an operation command signal received by the transmitter/receiver part 30F.

In this case, when the broadcasting waves include the operation control information including operation data indicative of causing the toys 4D, 4E, 4F to perform predetermined operations, the receiver 3 transmits the operation command signal dependent on the operation control information to the toys 4D, 4E, 4F. The operation command signal is provided through the transmitter/receiver parts 30D, 30E, 30F to the controllers 31D, 31E, 31F which in turn control the light emission driver 32D, the sound source part 32E and the motor driver 32F to cause the toys 4D, 4E, 4F to perform the operations, based on the operation command signal.

In the example in which these toys 4D, 4E, 4F are used as the peripheral devices 4, if the character in a broadcast program on the air acts to glow a cane, to speak his/her constant refrain or to rotate a windmill of a belt, the toys 4D, 4E, 4F may be operated to glow the cane, emit the constant refrain or rotate the windmill in the ordinary homes in which the receiver 3 is placed. This allows the user to enjoy the broadcast program more.

Figure 9:
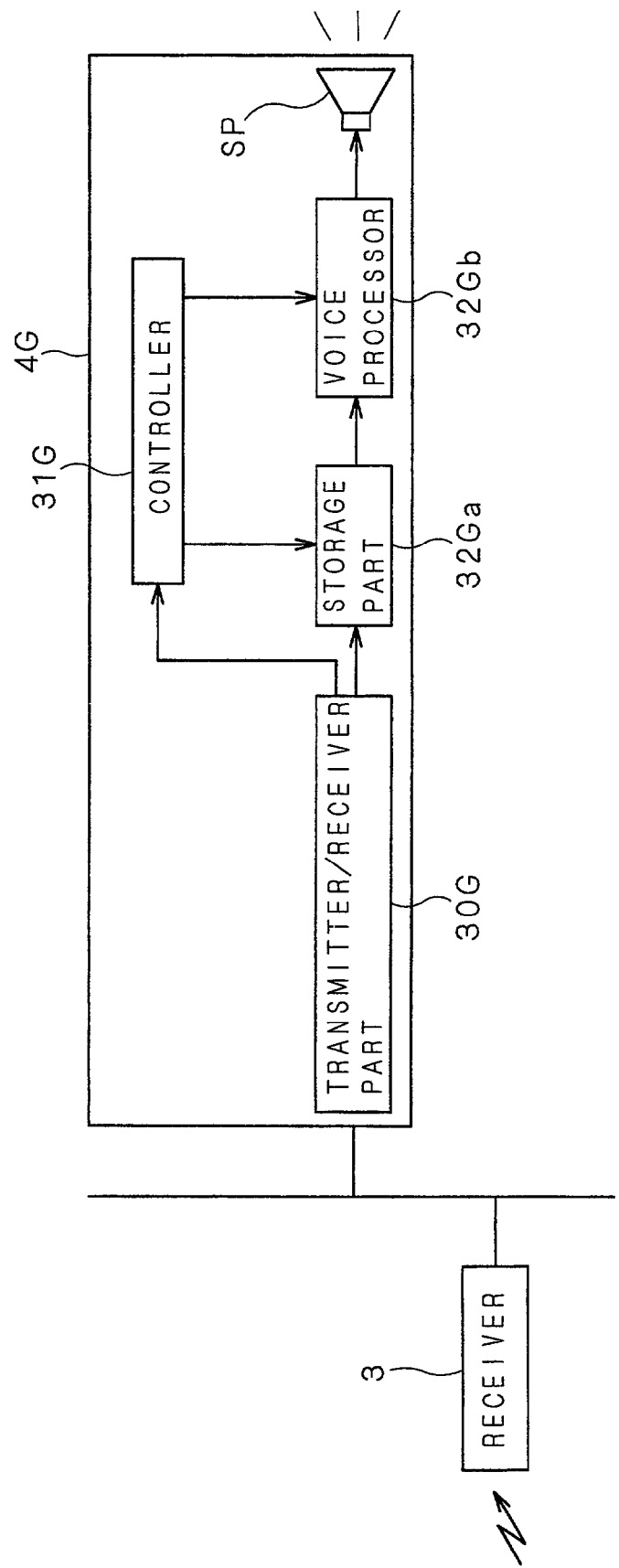
FIG. 9 is a block diagram of still another exemplary application of the broadcast program transmitting/receiving system.

In the example illustrated in FIG. 9, a toy 4G which emits a sound and which is capable of updating the sound is used as the peripheral device 4. Like the toy 4E, the toy 4G is assumed to be, for example, an imitation of a character who takes an active part in a broadcast program and who can voice or speak his/her constant refrain. However, the toy 4G is assumed to be capable of updating the constant refrain whenever the character changes his/her constant refrain.

The toy 4G comprises a storage part 32Ga capable of storing voice data; a voice processor 32Gb for reading the voice data stored in the storage part 32Ga to perform predetermined voice processing on the voice data to output the processed voice through a loudspeaker SP to the exterior; a transmitter/receiver part 30G capable of communicating with the receiver 3; and a controller 31G for controlling the storage part 32Ga and the voice processor 32Gb based on an operation command signal received by the transmitter/receiver part 30G.

In this case, when the character in the broadcast program speaks a new constant refrain and the broadcasting waves include the operation control information including predetermined voice data and its storage command, the receiver 3 transmits the operation command signal dependent on the operation control information to the toy 4G. The voice data included in the operation command signal is stored in the storage part 32Ga.

Thus, when the toy 4G is provided as the peripheral device 4, the data about the voice emitted from the toy 4G may be updated whenever the character changes his/her constant refrain.

<2.1.3 Other Exemplary Applications of First Type>

The broadcast program transmitting/receiving system according to the first preferred embodiment of the present invention is also applicable to other exemplary applications to be described below.

For example, a coffee maker may be employed as the peripheral device 4 and be controlled to make coffee ready for drinking in properly timed relation with the end of the broadcast program.

Further, a cooking device such as a gas cooker, an electric cooker and a microwave oven may be employed as the peripheral device 4 and be controlled to adjust heating power, an output and heating time of the cooking device in accordance with the contents of a cooking program (see a second exemplary application in a second preferred embodiment to be described later).

Furthermore, an audio system may be employed as the peripheral device 4 and be controlled to change the frequency characteristics of an amplifier and a loudspeaker of the audio system in accordance with musical genres of a music program.

Moreover, a personal computer may be employed as the peripheral device 4 and be controlled to open a home page regarding the broadcast program.

Further, a printer may be employed as the peripheral device 4 and be controlled to print out a recipe when a cooking program is on the air.

When broadcasting special earthquake information in the case where an earthquake occurs, the broadcasting waves may be caused to shut off the power to the peripheral devices 4.

The peripheral devices 4 to which the present invention may be applied include other conventional household electrical appliances such as a humidifier.

<2.2 Exemplary Applications of Second Type>

Exemplary applications of a second type are intended for a remote controller serving as a peripheral device for the receiver.

<2.2.1 System Construction>

Figure 10:
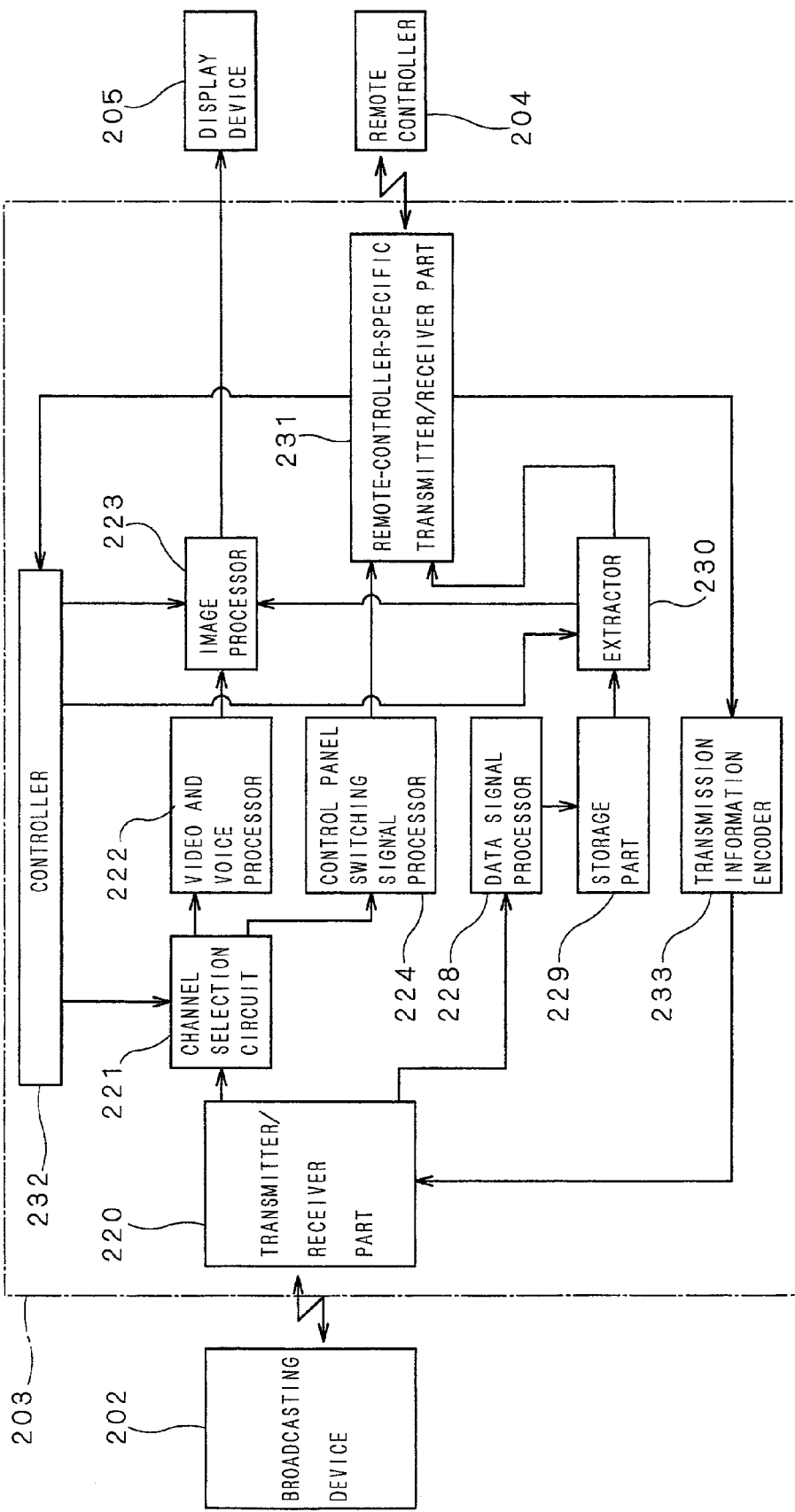
FIG. 10 is a block diagram of an exemplary application of a second type of the first preferred embodiment, which shows a construction of the broadcast program transmitting/receiving system and a receiver constituting the system.

FIG. 10 shows a broadcast program transmitting/receiving system 200 according to an exemplary application of the second type of the first preferred embodiment of the present invention. With reference to FIG. 10, the broadcast program transmitting/receiving system 200 comprises: a broadcasting device 202; a receiver 203; a remote controller 204 for various manual operations including switching between channels of the receiver 203; and a display device 205 for displaying a broadcast program supplied in the form of broadcasting waves in a wired or wireless manner from the receiver 203. Although only the single receiver 203 is shown in FIG. 10, there are actually a plurality of (generally a large number of) receivers 203 distributed because of the actual nature of the broadcasting system, each of the receivers 203 being capable of receiving the broadcasting waves from the broadcasting device 202. Each of the receivers 203 is accompanied by the display device 205 and the remote controller 204.

Information transmitted from the broadcasting device 202 to the receiver 203 includes manual operation control information which specifies variable manual operation display items of the remote controller 204 in accordance with the contents of the broadcast program and the like in addition to the video information and the voice information (broadcast data) about the broadcast program. The transmitted information is separated by the receiver 203 into the broadcast data, and the manual operation control information and the like. The broadcast data is outputted to the display device 205 and displayed as a television program including video and voice displays, whereas the manual operation control information and the like are transmitted by infrared communication or wireless communication to the remote controller 204, and are inputted to the remote controller 204.

The remote controller 204 has a control panel 240 (see FIG. 12), which will be described later, comprising a button display part 239a (display device) serving as a variable display element such as an LCD, and a touch panel 239b disposed on a screen of the control panel 240. The remote controller 204 is adapted so that the screen of the control panel 240 is changed to various button screens specified by the manual operation control information. A viewer or user touches the touch panel 239b depending upon the buttons of the changeable button screens, thereby to access various services provided.

<2.2.2 Broadcasting Device>

Figure 11:
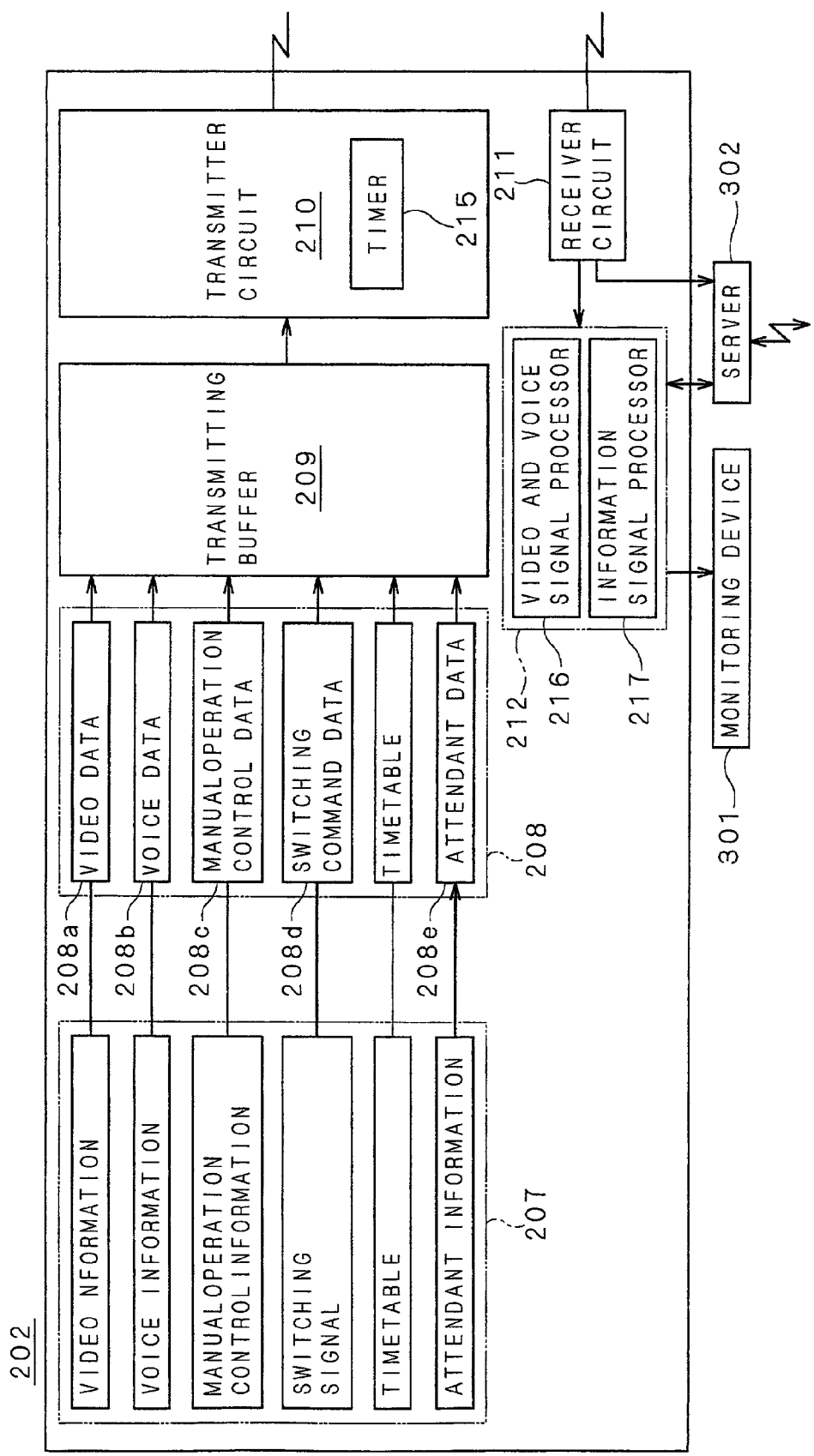
FIG. 11 is a block diagram of a broadcasting device constituting the broadcast program transmitting/receiving system.

The broadcasting device 202 is constructed as one form of the broadcasting device according to the present invention. With reference to FIG. 11, the broadcasting device 202 comprises: an information source 207 of various types of information including the broadcast program and its associated information; a transmission information encoder 208 for format conversion of the various types of information from the information source 207; a transmitting buffer 209 for temporarily storing the various types of information outputted from the transmission information encoder 208; a transmitter circuit 210 for transmitting and outputting the information from the transmitting buffer 209; a receiver circuit 211 for receiving broadcasting waves (to be described later) transmitted from the receiver 203; and a demodulation processor 212 for demodulating the broadcasting waves received by the receiver circuit 211.

The information source 207 serves as various materials to be used for production of programs in the broadcasting device 202. The information source 7 includes video information and voice information which constitute the broadcast program itself, manual operation control information for specifying the manual operation display items on the control panel of the remote controller 204, a control panel display switching command signal (switching signal), a timetable, and other attendant information.

The manual operation control information includes button data (manual operation element data) which specifies the button screen on the control panel 240 of the remote controller 204, and operation data which specifies the processing operation of the remote controller 204 in response to user inputs to the control panel 240, based on the button screen specified by the button data.

The control panel display switching command signal includes a command for changing a manual operation display item on the control panel 240 of the remote controller 204 to a manual operation display item specified by the manual operation control information, and a command for changing the changed manual operation display item to a normal manual operation display item for channel selection.

Other information such as textual information, if any, to be transmitted in addition to the video information, the voice information, the manual operation control information and the control panel display switching command signal is prepared and held as the attendant information in the information source 207.

The timetable specifies a progress schedule of the broadcast program in the form of an array of time information. The time table further specifies a point of time when to transmit the manual operation control information, and the timing of transmission of the control panel display switching command signal. For example, for the entire story of the broadcast program Pw which starts at time Ts and ends at time Te as shown in FIG. 3, the broadcasting device 202 transmits the manual operation control information specifying the manual operation display item on a new button screen of the remote controller 204 to the receiver 203 at the time Ts; transmits the control panel display switching command signal indicative of changing the manual operation display item of the remote controller 204 to the manual operation display item specified by the manual operation control information at the start time T1 of a time period during which a service is offered to the viewers in the broadcast program; and transmits the control panel display switching command signal indicative of returning the manual operation display item of the remote controller 204 to the original manual operation display item for channel selection at the end time T2 of the time period during which the service is offered. The timetable also specifies the time when to transmit other to-be-transmitted attendant information, if any.

The switching signal indicative of changing the manual operation display item of the remote controller 204 to the manual operation display item specified by the manual operation control information may be repeatedly or periodically transmitted at regular time intervals during the time period between the times T1 and T2 during which the service is offered to the viewers. This allows the broadcasting device 202 to offer a service for automatically changing the manual operation display item on the control panel 240 to a viewer who selects the channel to watch the program at some midpoint of the program.

In accordance with the timetable, the transmission information encoder 208 reads the video information and the voice information which serve as the broadcast data about the broadcast program, the manual operation control information, the control panel display switching command signal, and the attendant information from the information source 7 to perform required digital signal processing on the video information, the voice information, the manual operation control information, the control panel display switching command signal and the attendant information. Then, the transmission information encoder 208 converts the video information, the voice information, the manual operation control information, the control panel display switching command signal and the attendant information into video data 208a, voice data 208b, manual operation control data 208c, switching command data 208d, and attendant data 208e having predetermined data formats, respectively, to transmit the data 208a, 208b, 208c, 208d and 208e to the transmitting buffer 209.

The transmitter circuit 210 comprises a timer 215 (clocking element), and suitably reads the video data 208a and the voice data 208b from the transmitting buffer 209 in accordance with the timing as specified in the timetable stored in the transmitting buffer 209, based on the clocking in the timer 215. Similarly, the transmitter circuit 210 reads the manual operation control data 208c, the switching command data 208d and the attendant data 208e from the transmitting buffer 209 in accordance with the timing as specified in the timetable, based on the clocking in the timer 215. The transmitter circuit 210 modulates these data 208a to 208e by a scheme suitable for a broadcasting system (e.g., terrestrial broadcasting, communication satellite broadcasting, cable TV, or Internet TV) to which the broadcasting device 202 conforms, and transmits and outputs the modulated data in the form of broadcasting waves.

Figure 13A:
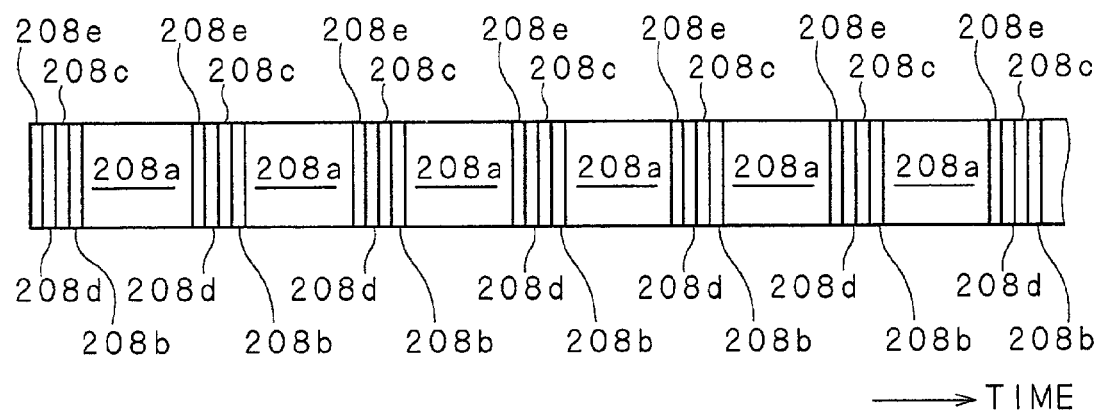
FIG. 13A shows an example of formats of multiplexed data to be transmitted from the broadcasting device to the receiver.
Figure 13B:
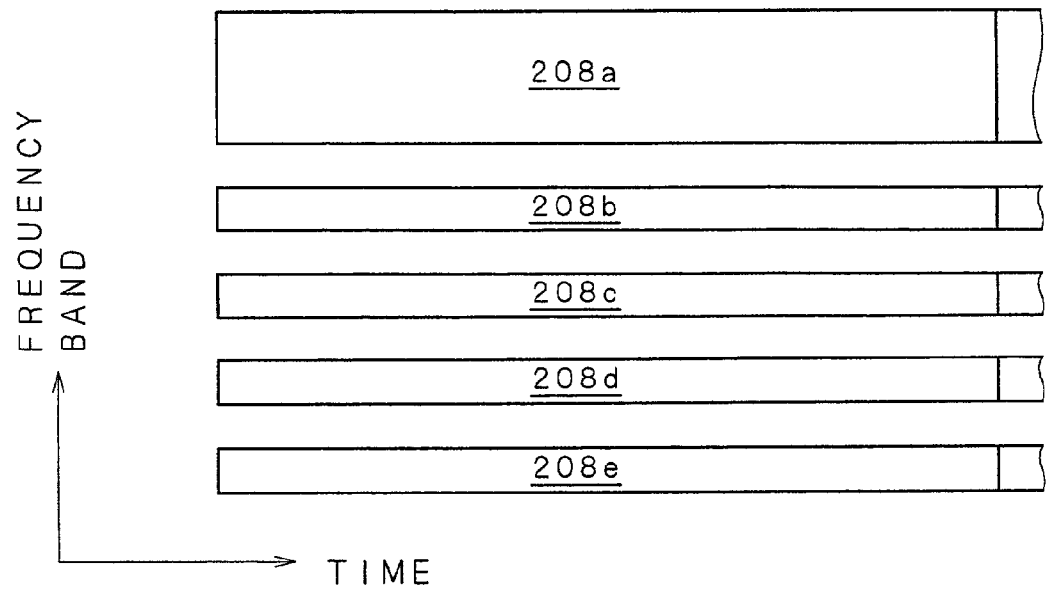
FIG. 13B shows another example of the formats of multiplexed data to be transmitted from the broadcasting device to the receiver.

The broadcasting waves employed herein include multiplex communication waves outputted by multiplexing a plurality of types of data such as the video data 208a, the voice data 208b, the manual operation control data 208c, the switching command data 208d and the attendant data 208e. The multiplexing of the data may be performed, for example, by a time division multiplex scheme for transmitting a plurality of types of data by using successive time intervals as shown in FIG. 13A or by a frequency multiplex scheme for transmitting a plurality of data at different frequencies as shown in FIG. 13B. The clocking of the timer 215 may be performed in accordance with the broadcasting time (broadcasting schedule) of the broadcast program or with reference to elapsed time since the start of broadcasting. In either case, the switching signal for the manual operation display item on the control panel is transmitted to the receiver 203, based on the timing information about the progress of broadcasting.

The receiver circuit 211 receives the broadcasting waves transmitted from the receiver 203 by a scheme suitable for a broadcasting system (e.g., terrestrial broadcasting, communication satellite broadcasting, broadcasting satellite broadcasting, cable TV, or Internet TV) to which the receiver 203 conforms. The receiver circuit 211 receives a signal through an antenna in the case of wireless communication such as terrestrial broadcasting and the communication satellite broadcasting.

The demodulation processor 212 comprises a video and voice signal processor 216 for demodulating a video signal and a voice signal received by the receiver circuit 211, and an information signal processor 217 for demodulating information signals other than the video signal and the voice signal which are received by the receiver circuit 211. The video signal, the voice signal and other information signals processed by the demodulation processor 212 are outputted to a monitoring device 301 including a predetermined display device and a loudspeaker not shown.

The user can utilize this system to conduct commercial transaction or TV shopping, which will be described later. In such a case, a signal transmitted from the receiver 203 includes selection and purchase information about a commodity product and the like. This signal is demodulated and converted into computer-processable digital information, and is also stored in a server 302.

The selection and purchase information about the commodity product stored in the server 302 is transmitted through a network to a commodity product supplier which in turn identifies a viewer (or a user who want to purchase the commodity product) and his/her credit card number. If the selection and purchase information is valid, the supplier performs the process of shipment of the commodity product, and the like.

The contents of the broadcasting waves to be transmitted from the broadcasting device 202 to the receiver 203 may be produced by combining data in the broadcasting device 202 as in this exemplary application or may be obtained by inputting an external combined signal to the broadcasting device 202.

<2.2.3 Receiver>

The receiver 203 which is placed in ordinary homes receives the broadcasting waves transmitted from the broadcasting device 202 to reproduce the broadcast program and the like on the display device 205. The receiver 203 is constructed as a single electronic unit, for example, known as a set-top box (STB).

Referring again to FIG. 10, the receiver 203 comprises a transmitter/receiver part 220 and a channel selection circuit 221 serving as a channel-selection element and a data-separation element. The transmitter/receiver part 220 has the function of receiving the broadcasting waves for a plurality of channels transmitted from the broadcasting device 202 and the function of transmitting a transmission signal through a telephone, CATV or Internet to the broadcasting device 202. The channel selection circuit 221 has the function of extracting (or channel-selecting) part of the video and voice data 208*a* and 208*b* included in a broadcasting wave for a channel designated by the use of the remote controller 204 from the broadcasting waves for the plurality of channels received by the transmitter/receiver part 220, and the function of extracting the control panel switching command data 208*d* when the control panel switching command data 208*d* is included in the broadcasting wave for the same selected channel.

A video and voice processor 222 separately demodulates parts of the video and voice data 208*a* and 208*b* channel-selected by the channel selection circuit 221 to recover the original video information and the original voice information. An image processor 223 performs predetermined image processing on the recovered video information. A control panel switching signal processor 224 (a switching signal extraction element) demodulates the switching command data 208*d* extracted by the channel selection circuit 221 to recover the original switching signal. A data signal processor 228 demodulates the manual operation control data 208*c* and the attendant data 208*e* included in the broadcasting waves for the plurality of channels received by the transmitter/receiver part 220 to recover the original manual operation control information and the original attendant information. A storage part 229 stores the manual operation control information and the attendant information demodulated by the data signal processor 228. An extractor 230 extracts required information from the information stored in the storage part 229. A remote-controller-specific transmitter/receiver part 231 transmits the information extracted by the extractor 230 and the switching signal recovered by the control panel switching signal processor 224 to the remote controller 204. The remote-controller-specific transmitter/receiver part 231 also has the function of receiving a signal wave transmitted from the remote controller 204.

A controller 232 controls the channel selection circuit 221, the image processor 223 and the extractor 230, based on a control signal transmitted from the remote controller 204 and received by the remote-controller-specific transmitter/receiver part 231. A transmission information encoder 233 performs required processing on an information signal sent from the remote-controller-specific transmitter/receiver part 231 to output the processed signal to the transmitter/receiver part 220 which in turn transmits the processed signal to the broadcasting device 202.

In this exemplary application, the transmitter/receiver part 220, the remote-controller-specific transmitter/receiver part 231 and the transmission information encoder 233 serve as main constituents of a transfer element for transferring the information from the remote controller 204 to the broadcasting device 202. Detailed functions of these constituents will be described below.

The transmitter/receiver part 220 receives the broadcasting waves transmitted from the broadcasting device 202 by a scheme to which the transmitter circuit 210 of the broadcasting device 202 conforms, and transmits the broadcasting waves through, for example, a telephone (including a portable telephone), Internet or CATV to the receiver circuit 211 by a scheme to which the receiver circuit 211 of the broadcasting device 202 conforms.

The remote-controller-specific transmitter/receiver part 231 is adapted so that, when receiving a control signal indicative of transmission to the broadcasting device 202, it outputs an information signal received with the control signal to the transmission information encoder 208. The information signal outputted to the transmission information encoder 208 is transmitted from the transmitter/receiver part 220 to the broadcasting device 202.

The extractor 230 has the function of extracting the manual operation control information included in the broadcasting wave for the same channel as that selected by the channel selection circuit 221 from the information stored in the storage part 229 to output the extracted manual operation control information to the remote-controller-specific transmitter/receiver part 231, and the function of extracting the attendant information included in the broadcasting wave for the same channel as that selected by the channel selection circuit 221 from the information stored in the storage part 229 to output the extracted attendant information to the image processor 223. The extractor 230 executes one or both of the two functions in accordance with an instruction from the controller 232.

The image processor 223 has previously established functions about image processing expected during user's input operation from the remote controller 204. For example, the previously established functions include a zoom function for magnifying or zooming part of a video output displayed on the display device 205, a scroll function for scrolling a video output displayed on the display device 205 up and down and to the right and left, a pause function for causing a video output displayed on the display device 205 to pause, and an image superimposition function for superimposing a screen containing the attendant information, e.g. textual information, provided from the extractor 230 upon a screen generated by the video information outputted from the video and voice processor 222.

When receiving a channel selection signal from the remote controller 204, the controller 232 causes the channel selection circuit 221 to perform the above-mentioned operations for the channel designated by the channel selection signal, and causes the extractor 230 to extract the manual operation control information included in the broadcasting wave for the same channel from the storage part 229 to output the manual operation control information to the remote-controller-specific transmitter/receiver part 231. The manual operation control information outputted to the remote-controller-specific transmitter/receiver part 231 is transmitted to the remote controller 204.

When receiving a control signal about image processing from the remote controller 204, the controller 232 causes the image processor 223 to perform a function designated by the control signal among the above-mentioned functions previously established in the image processor 223. In this process, if the image processing requires the attendant information stored in the storage part 229, the controller 232 outputs to the extractor 230 an instruction to extract the attendant information to output the attendant information to the image processor 223. Then, the extractor 230 extracts the attendant information from the storage part 229 to provide the attendant information to the image processor 223.

The display device 205 performs predetermined signal processing on the video information supplied from the image processor 223 of the receiver 203 to display the video on a built-in CRT (Cathode Ray Tube), LCD (Liquid Crystal Display) panel or the like, and amplifies the voice information supplied from the image processor 223 of the receiver 203 to output the amplified voice to an built-in loudspeaker.

<2.2.4 Remote Controller>

Figure 12:
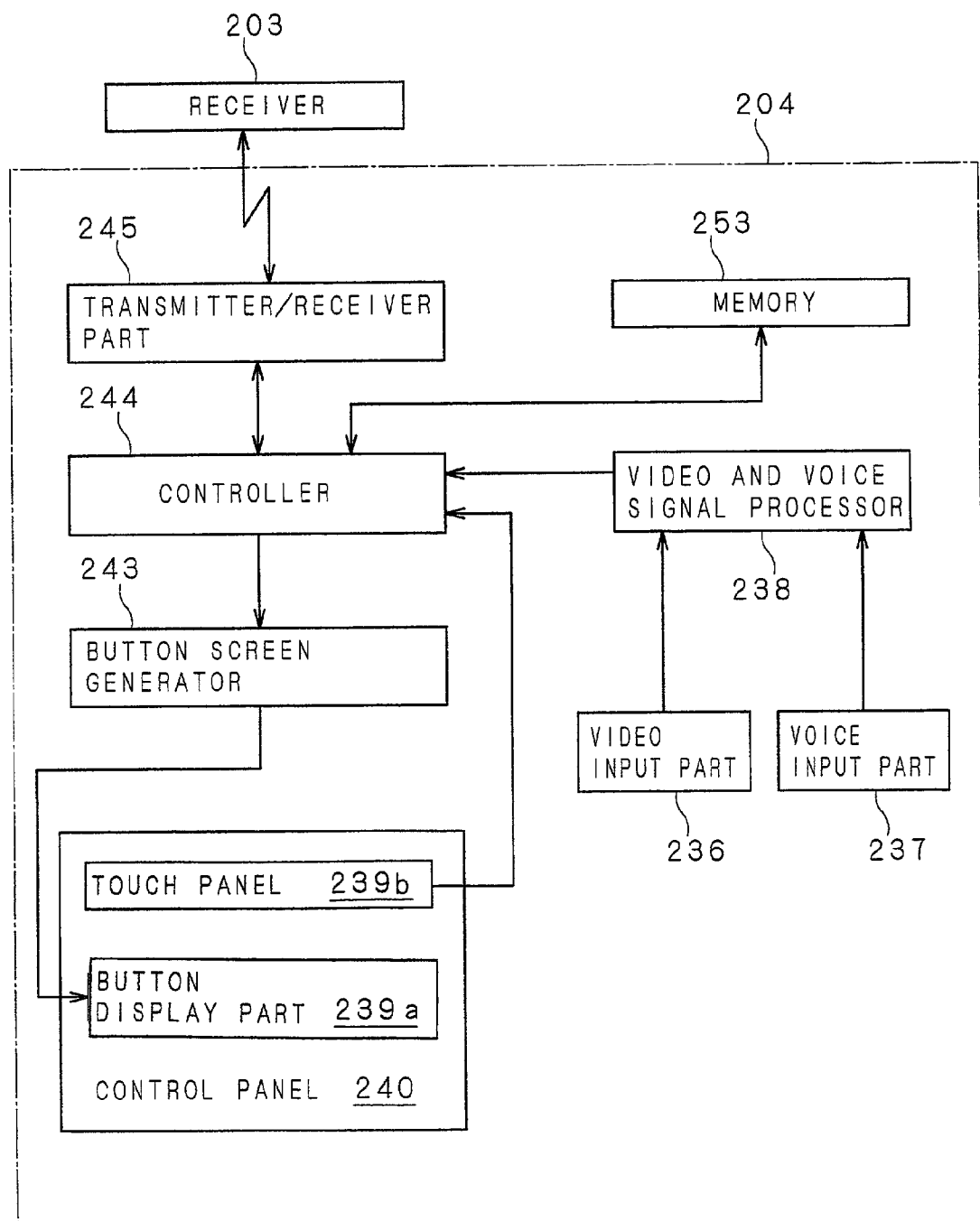
FIG. 12 is a block diagram of a remote controller constituting the broadcast program transmitting/receiving system.
Figure 14:
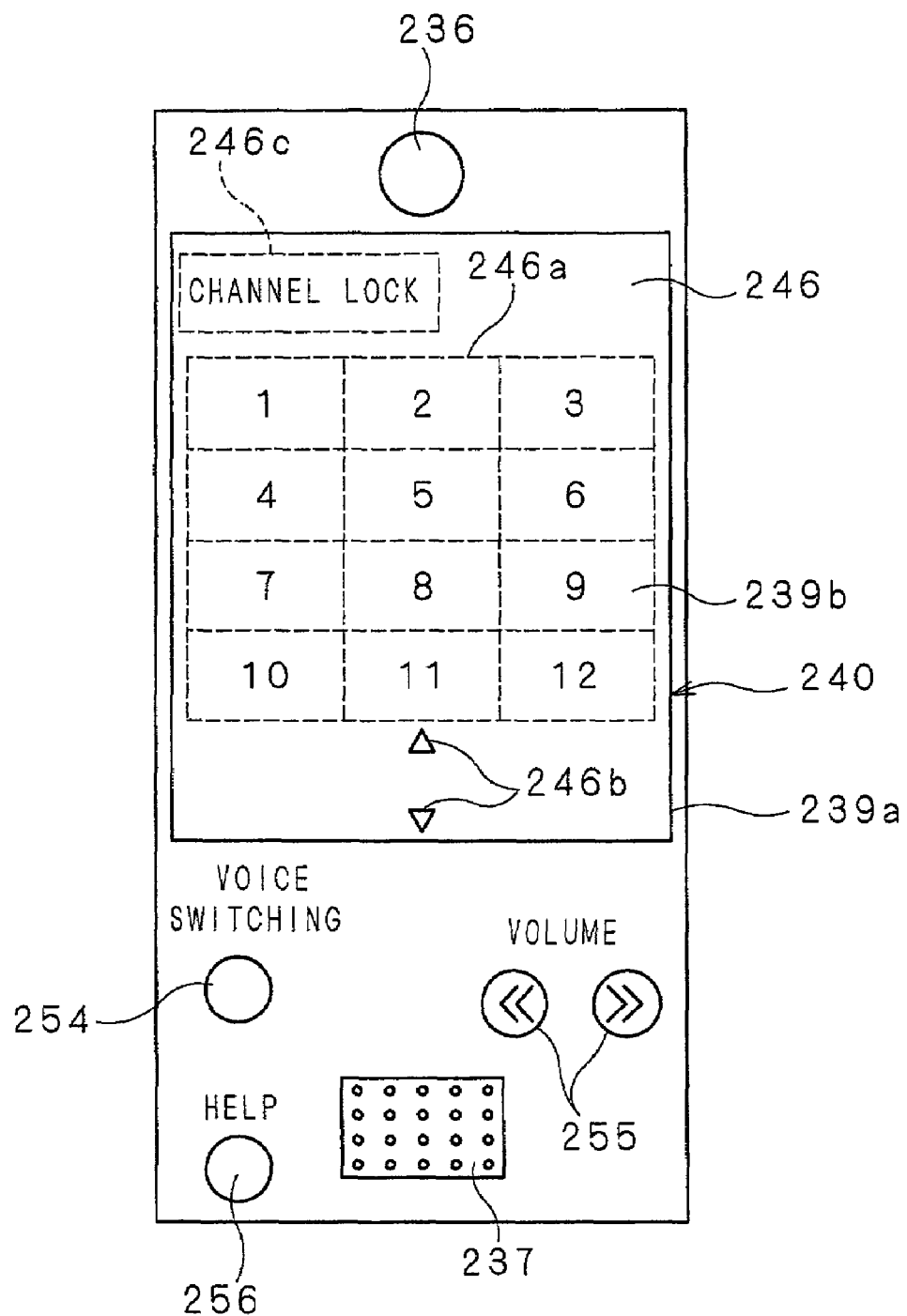
FIGS. 14 through 16 show examples of a button screen of the remote controller.

With reference to FIGS. 12 and 14, the remote controller 204 comprises: a video input part 236 including a CCD camera and the like; a voice input part 237; a video and voice signal processor 238 for performing required processing on the video information inputted from the video input part 236 and the voice information inputted from the voice input part 237; the control panel 240 having the button display part 239a including, for example, an LCD (Liquid Crystal Display) and the transparent touch panel 239b formed on the button display part 239a; and a button screen generator 243 for generating a button screen to be displayed on the button display part 239a.

A controller 244 controls the drive of the button screen generator 243, and processes information inputted to the control panel 240 and the video and voice information outputted from the video and voice signal processor 238. A transmitter/receiver part (information signal transmission element) 245 has the function of receiving the manual operation control information and the control panel display switching command signal which are transmitted from the receiver 203, and the function of transmitting to the receiver 203 the information inputted from the control panel 240 and the video and voice information outputted from the video and voice signal processor 238. A memory 253 stores the manual operation control information transmitted from the receiver 203.

The button screen generator 243 has previously established button data specifying a channel selection screen which is a button screen for channel selection. The button screen generator 243 generates the channel selection screen to display the channel selection screen on the button display part 239a, based on the button data, in accordance with an instruction from the controller 244.

A button screen 246 shown in FIG. 14 is an example of the channel selection screen (and is referred to hereinafter as a channel selection screen 246). This channel selection screen 246 is provided with numeric buttons indicating "1" through "12" for direct input of a selected channel number, up and down buttons 246b for incrementing and decrementing the selected channel number one by one, and a channel lock button 246c. The channel lock button 246c is provided to lock the button screen 246 to prevent the controller 244 from automatically changing the channel selection screen 246 to another button screen.

The button screen generator 243 has the function of generating other button screens based on other button data inputted from the controller 244 to the button screen generator 243. In accordance with an instruction from the controller 244, the button screen generator 243 generates one of a button screen specified by the inputted button data and the channel selection screen 246 previously established in the button screen generator 243 to display the generated screen on the button display part 239a. The button data inputted from the controller 244 to the button screen generator 243 and established is overwritten each time button data is inputted and established.

Figure 15:
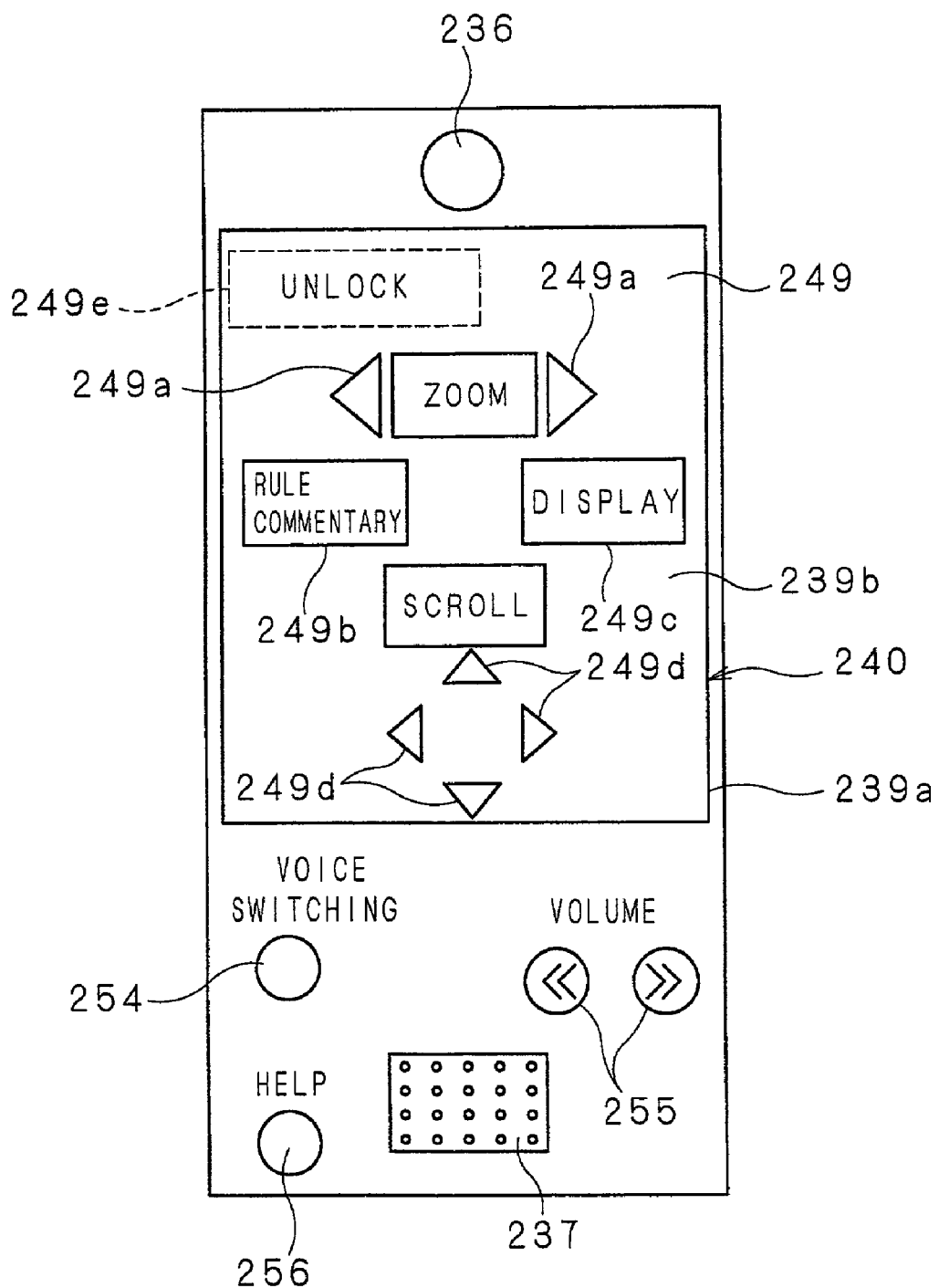
Figure 16:
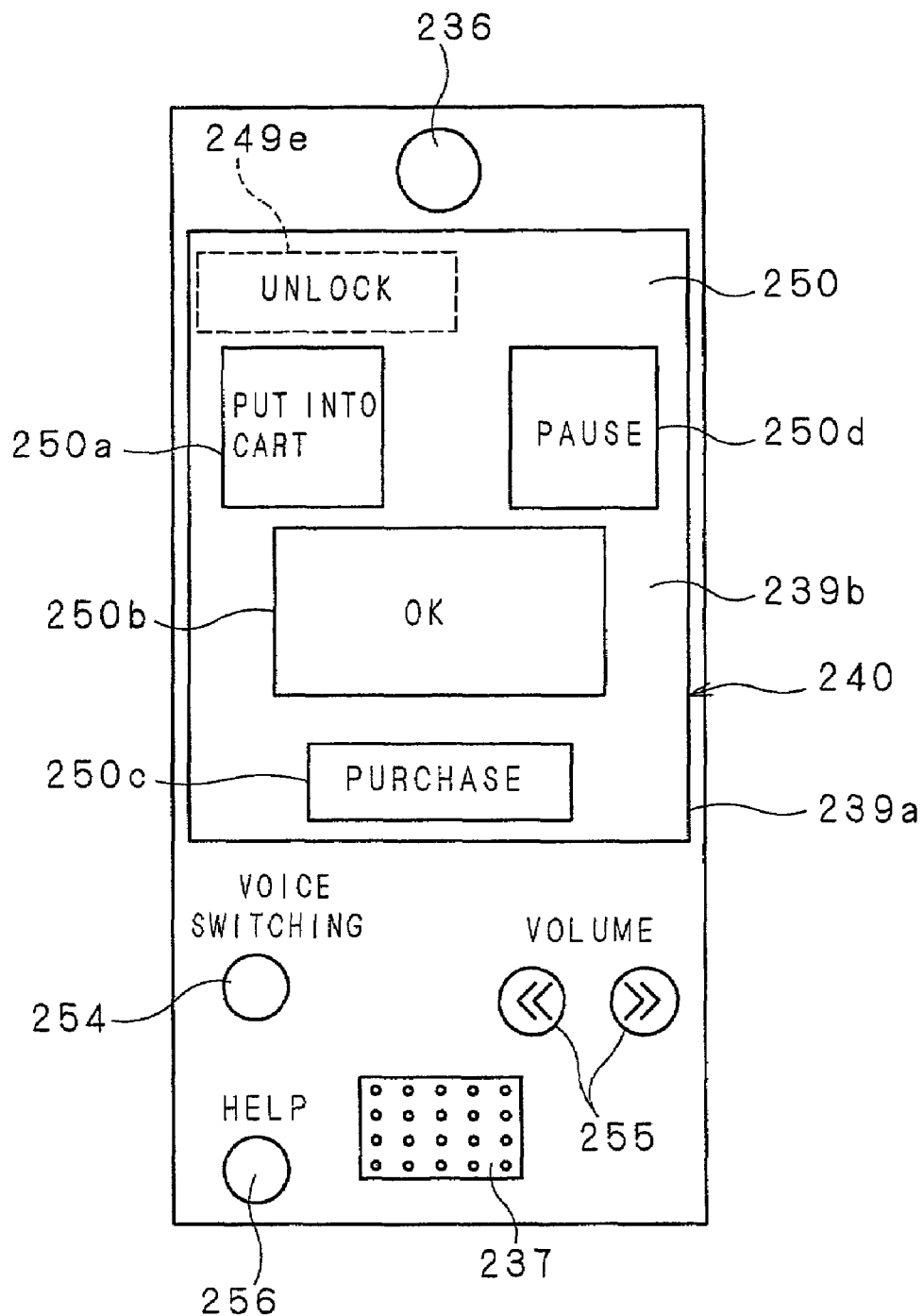

Button screens 249 and 250 shown in FIGS. 15 and 16 are examples of the button screens specified by other button data. The button screen 249 of FIG. 15 is a screen when the broadcast program is a sportscast, for example, live or relay broadcasting of a baseball game (in a sport-watching mode). The button screen 249 is provided with zoom-in and zoom-out buttons 249a for zooming in and out a television image, a rule commentary button 249b for displaying a rule commentary item for the sport on the television screen, a display button 249c, scroll buttons 249d for scrolling the television screen up and down and to the right and left, and an unlock button 249e for manually changing the button screen 249 to the channel selection screen 246. The scrolling may be achieved by extraction from a large screen or by channel switching in a multi-angle service.

Each time the rule commentary button 249b is pressed, a displayed item such as "walk," "strikeout" and the like in the case of broadcasting of a baseball game is changed to another item one by one in a lower part of the television screen. When the user presses the display button 249c with the item displayed on the television screen, a rule commentary about the item is displayed as textual information, for example, in the lower part of the television screen.

The button screen 250 of FIG. 16 is a screen when the broadcast program is a television shopping program in a TV shopping mode. Assumed in this case is, for example, a broadcast program planned such that a viewer does his/her shopping while pushing a shopping cart in a store. The button screen 250 is provided with a "put into cart" button 250a for reservation of a commodity product which the viewer is to purchase (for informing a seller that the viewer will make a purchase reservation although he or she has not yet decided to purchase the product), an OK button 250b for confirmation of the reserved product (for displaying information about the product on the television screen), a purchase button 250c for purchase of the reserved product (for informing the seller that the viewer has decided to purchase the product), a pause button 250d for causing the cart moving on to pause (for causing a picture displayed on the television screen to pause), and the unlock button 249e (similar in function to the unlock button of FIG. 15).

The controller 244 has previously established operation data specifying a processing operation to be performed by the controller 244 upon an output signal outputted from the control panel to the controller 244 in response to a manual input operation inputted to the control panel 240 based on the channel selection screen 246 when the channel selection screen 246 is displayed on the button display part 239a.

The controller 244 is adjusted to initially cause the button screen generator 243 to generate the channel selection screen 246 to display the channel selection screen 246 on the button display part 239a at turn-on of power, and to operate in accordance with the operation data corresponding to the channel selection screen 246.

The controller 244 stores the manual operation control information received through the transmitter/receiver part 245 from the receiver 203 in the memory 253. When the controller 244 receives the control panel display switching command signal from the receiver 203 and the control panel display switching command signal indicates switching to the button screen specified by the manual operation control information, the controller 244 reads the button data included in the manual operation control information from the memory 253 to provide the button data to the button screen generator 243, and also causes the button screen generator 243 to generate the button screen specified by the inputted button data to display the button screen on the button display part 239a.

On the other hand, when the control panel display switching command signal indicates switching to the channel selection screen 246, the controller 244 causes the button screen generator 243 to generate the channel selection screen 246 to display the channel selection screen 246 on the button display part 239a.

In parallel with the switching of the button screen, the controller 244 selects operation data corresponding to the button screen to be displayed on the button display part 239a between the operation data corresponding to the channel selection screen 246 and the operation data included in the manual operation control information. In this example shown in FIG. 16, the controller 244 selects the operation data included in the manual operation control information.

Then, in accordance with the operation data selected, the controller 244 processes the output signal outputted from the control panel 240 to the controller 244 in response to the manual input operation inputted to the touch panel 239b of the control panel 240. This allows the controller 244 to properly process the signal outputted from the control panel 240 to the controller 244 in accordance with changes in display items of the button screen displayed on the button display part 239a.

Upon receipt of the manual operation control information from the receiver 203, the controller 244 stores the manual operation control information in the memory 253 in the controller 244. The controller 244 reads and executes the manual operation control information, as required. Each time the manual operation control information is received, the received manual operation control information is stored in the memory 253 by overwriting the previous manual operation control information, for example.

The controller 244 processes the video information and the voice information outputted from the video and voice signal processor 238 in response to the manual input operation inputted from the control panel 240, based on the operation data corresponding to the button screen to be displayed on the button display part 239a. For instance, depending on the operation data, the video information and the voice information may be transmitted from the transmitter/receiver part 220 to the receiver 203 and further transmitted from the receiver 203 to the broadcasting device 202.

The control panel 240 locates a portion of the button display part 239a selectively touched by the viewer by means of a sensor of the touch panel 239b, and outputs various signals to the controller 244 depending on the located portion.

In this exemplary application, the remote controller 204 comprises a voice switching button 254 for switching, for example, between languages in a bilingual broadcast, a volume control button 255, and a HELP button 256 for displaying explanations about how to operate the remote controller 204 on the television screen.

The button screen generator 243 and the controller 244 constitute an switching element in this exemplary application.

In other words, the remote controller 204 is capable of controlling an audio- and/or visual-electronic device. The remote controller 204 comprises the variable display 239a and the receiver for receiving the control signal synchronized with reproduction of content in the audio- and/or visual-electronic device. A display produced on the variable display 239a is changed in response to the control signal.

<2.2.5 Operation: Button Screen Switching Operation>

The operation of the broadcast program transmitting/receiving system 200 of the above-mentioned construction will be described with reference to FIGS. 10 through 12.

First, in the broadcasting device 202, the video information, the voice information, the manual operation control information, the control panel display switching command signal and the attendant information to be used for production of a desired program are selected from the various materials of the information source 207, as shown in FIG. 11. The timetable is produced which specifies the time when to transmit and output each of the selected information and signal.

Next, the transmission information encoder 208 reads the video information and the voice information serving as the broadcast program, the manual operation control information, the control panel display switching command signal and the attendant information from the information source 207, performs required digital signal processing on the read information and signal, and converts the processed information and signal into the video data 208a, the voice data 208b, the manual operation control data 208c, the switching command data 208d and the attendant data 208e having predetermined data formats, respectively. The format of the timetable is maintained.

The video data 208a, the voice data 208b, the manual operation control data 208c, the switching command data 208d, the attendant data 208e and the timetable which are obtained in the transmission information encoder 208 are temporarily stored in the transmitting buffer 209, and thereafter are read out suitably to the transmitter circuit 210 in timed relation as specified by the timetable, based on the clocking in the timer 215 of the transmitter circuit 210. The transmitter circuit 210 modulates these data 208a to 208e by a scheme suitable for a broadcasting system to which the transmitter circuit 210 conforms, and transmits and outputs the multiplexed broadcasting waves (see FIG. 13A or 13B).

The broadcasting waves thus transmitted from the broadcasting device 202 are received by the transmitter/receiver part 220 of the receiver 203 placed in ordinary homes. The broadcasting waves received by the transmitter/receiver part 220 are outputted to the channel selection circuit 221 and the data signal processor 228.

The data signal processor 228 demodulates the manual operation control data 208c and the attendant data 208e included in the broadcasting waves for the plurality of channels received by the transmitter/receiver part 220 to recover the original manual operation control information and the original attendant information. The storage part 229 stores the manual operation control information and the attendant information recovered by the data signal processor 228.

In the remote controller 204, on the other hand, the channel selection screen 246 is displayed on the button display part 239a of the control panel 240 by the initial operation performed at the turn-on of power to the remote controller 204. The controller 244 is ready for processing the output signal to be outputted from the control panel 240 in response to the manual input operation to be inputted to the channel selection screen 246 in accordance with the operation data corresponding to the channel selection screen 246.

In this state, the viewer touches a touch panel area on the numerical buttons 246a of the channel selection screen 246 of the remote controller 204 or operates otherwise manually to select a desired channel. The manual operation of selecting the channel causes a signal responsive thereto to be outputted from the control panel 240 to the controller 244. The controller 244 processes the signal outputted from the control panel 240 in accordance with the operation data corresponding to the channel selection screen 246 previously established in the controller 244, and transmits the processed signal as a channel selection command indicative of selecting that channel through the transmitter/receiver part 245 to the receiver 203.

In the receiver 203, the channel selection command transmitted from the transmitter/receiver part 245 of the remote controller 204 is received by the remote-controller-specific transmitter/receiver part 231 and outputted to the controller 232. Upon receipt of the channel selection command, the controller 232 causes the channel selection circuit 221 to perform the process (channel selection) of extracting the video data 208a and the voice data 208b included in the broadcasting wave for the channel determined by the channel selection command from the broadcasting waves for the plurality of channels received by the transmitter/receiver part 220. The video and voice processor 222 separately demodulates the extracted video and voice data 208*a* and 208*b* to recover the original video information and the original voice information which in turn are outputted to the display device 205. This allows a channel-selected broadcast program to appear on the display device 205.

The controller 232, as well as causes the channel selection circuit 221 to perform the above-mentioned processing, causes the extractor 230 to extract the manual operation control information included in the broadcasting wave for the same channel as the selected channel from the storage part 229 to output the extracted manual operation control information to the remote-controller-specific transmitter/receiver part 231. The manual operation control information outputted to the remote-controller-specific transmitter/receiver part 231 is transmitted from the remote-controller-specific transmitter/receiver part 231 to the remote controller 204.

In the remote controller 204, the manual operation control information transmitted from the receiver 203 is received by the transmitter/receiver part 245 and outputted to the controller 244. The manual operation control information outputted to the controller 244 is temporarily stored in the memory 253. This allows the remote controller 204 to be ready for button screen switching of the control panel 240.

On the other hand, when the switching command data 208*d* is included in the broadcasting wave for the same selected channel, the controller 232 of the receiver 203 causes the channel selection circuit 221 to perform the process of extracting the switching command data 208*d* from the broadcasting wave. The control panel switching signal processor 224 demodulates the switching command data 208*d* extracted by the channel selection circuit 221 to recover the control panel display switching command signal which in turn is transmitted through the remote-controller-specific transmitter/receiver part 231 to the remote controller 204.

In the remote controller 204, the control panel display switching command signal transmitted from the receiver 203 is received by the transmitter/receiver part 245 and is outputted to the controller 244. The controller 244 receives the control panel display switching command signal indicative of switching the manual operation display item of the control panel 240 to the manual operation display item specified by the manual operation control information. Then, the controller 244 reads the button data included in the manual operation control information from the memory 253 to input the button data to the button screen generator 243, and causes the button screen generator 243 to generate the button screen specified by the inputted button data to display the button screen on the button display part 239*a*. This causes the button screen generator 243 to change the button screen on the button display part 239*a* from the channel selection screen 246 to the button screen (e.g. the screen of FIG. 15) specified by the button data.

If the control panel display switching command signal indicates the switching to the channel selection screen 246, the controller 244 causes the button screen generator 243 to generate the channel selection screen 246 to display the channel selection screen 246 on the button display part 239*a*. This changes the button screen on the button display part 239*a* to the channel selection screen 246.

In parallel to the switching between the button screens, the controller 244 selects the operation data corresponding to the button screen to be displayed on the button display part 239*a* between the operation data corresponding to the channel selection screen 246 and the operation data included in the manual operation control information. In the example shown in FIG. 15, the controller 244 selects the operation data included in the manual operation control information, i.e., the operation data stored in the memory 253. Then, the controller 244 processes the output signal outputted from the control panel 240 to the controller 244 in response to the manual input operation inputted to the control panel 240 in accordance with the selected operation data. This allows the controller 244 to properly process the signal received from the control panel 240 in accordance with changes in button screen items displayed on the button display part 239*a*.

In this manner, the button screen of the control panel 240 of the remote controller 204 is automatically changed from the channel selection screen 246 to, for example, the button screen 249 in the sport-watching mode shown in FIG. 15 or the button screen 250 in the TV shopping mode shown in FIG. 16 in accordance with the broadcast program displayed on the display device 205. The viewer can manually operate the changed button screen to obtain services offered by the button screen.

<2.2.6 Operation: Example of Function Buttons Predetermined on Button Screen>

Function buttons to be displayed on the button screen may include a function button for superimposing information, e.g. textual information, offered as a service from the broadcasting device 202 upon the video information constituting the broadcast program to display the composite information on the display device 205.

Specifically, when the viewer presses a function button displayed on the button screen, e.g., the rule commentary button 249*b* on the button screen 249 in the sport-watching mode shown in FIG. 15, a signal dependent on the button 249*b* is outputted from the control panel 240 to the controller 244. In response to the signal from the control panel 240, the controller 244 transmits a control signal through the transmitter/receiver part 220 to the receiver 203.

In the receiver 203, the control signal transmitted from the transmitter/receiver part 245 of the remote controller 204 is received by the remote-controller-specific transmitter/receiver part 231 and outputted to the controller 244. In accordance with the control signal, the controller 244 causes the extractor 230 to extract the attendant information stored in the storage part 229, e.g. textual information about the rule commentary, to output the attendant information to the image processor 223. In parallel with this operation, the controller 244 causes the image processor 223 to superimpose the textual information about the rule commentary from the extractor 230 upon the video information outputted from the video and voice processor 222 to display the composite image on the display device 205. This allows the display device 205 to show the textual information about the rule commentary superimposed on the television video.

The function buttons to be displayed on the button screen may further include a transfer function button for transmitting video and voice inputted from the video input part 236 and the voice input part 237 in the remote controller 204 to the broadcasting device 202.

Specifically, when the viewer presses a video and voice transmission button (not shown) displayed on the button screen, viewer's video and voice are inputted from the video input part 236 and the voice input part 237 in the remote controller 204. The video information and the voice information are outputted through the video and voice signal processor 238 to the controller 244. The controller 244 outputs a control signal indicative of transmitting the video and voice information to the broadcasting device 202 in addition to the video and voice information through the transmitter/receiver part 245 to the receiver 203.

In the receiver 203, the remote-controller-specific transmitter/receiver part 231 receives the video information, the voice information and the control signal which are transmitted from the transmitter/receiver part 245 of the remote controller 204. Upon receipt of the control signal, the remote-controller-specific transmitter/receiver part 231 outputs the video information and the voice information to the transmission information encoder 233. The transmission information encoder 233 encodes the video information and the voice information, and then transmits the encoded video and voice information through the transmitter/receiver part 220 to the broadcasting device 202 through a telephone network, for example.

In the broadcasting device 202, the receiver circuit 211 receives the video information and the voice information which are transmitted from the transmitter/receiver part 220 of the receiver 203. The video and voice signal processor 238 performs required processing on the video information and the voice information which are received by the receiver circuit 211, and then outputs the processed video and voice information to the monitoring device 301 and the server 302. If the broadcast program is a live program, the video and voice signals may be combined with the contents of the broadcast program to allow the viewer to participate in the program displayed on the display device 205 on the viewer side through his/her video and voice.

The remote controller 204 may capture only one of the video and the voice, rather than both, to transfer the captured signal via the receiver 203 to the broadcasting device 202. The video information captured by the remote controller 204 may be either still or moving images.

Other examples of the function buttons include the "put into cart" button 250*a* for putting the product into the cart, and the purchase button 250*c*. The attendant information included in the broadcasting waves includes a product identification number indicating which product appears on a presentation screen on the air at that point of time. When the viewer touches the "put into cart" button 250*a*, the identification number of the product being displayed at that time on the display device 205 is extracted from the attendant information, and this product identification number and information indicating that the viewer is to purchase the product are stored in an allocated area of the storage part 229 corresponding to a "cart". Next, when the viewer touches the purchase button 250*c*, a signal so indicating is transmitted from the remote controller 204 to the receiver 203, and the product identification number temporarily stored in the area of the storage part 229 corresponding to the "cart" together with an identification number of the receiver 203 is transferred to the broadcasting device 202.

The broadcasting device 202 temporarily stores the identification numbers in the server 302, and transfers the identification numbers via a network to the product supplier. This allows the product supplier to know for which product the supplier has received a purchase order from the viewer who uses which receiver. Based on such information, the transaction including the shipment of the product is started. The viewer may use credit previously cataloged in each receiver 203 to make a payment for the product.

The functions achievable by the buttons displayed on the button screen may include a zoom function for magnifying or zooming part of the video displayed on the display device 205, a scroll function for scrolling the video displayed on the display device 205 up and down and to the right and left, and a pause function for causing the video displayed on the display device 205 to pause.

For example, when the viewer presses the zoom buttons 249*a* in the sport-watching mode shown in FIG. 15, a signal dependent on the buttons 249*a* is outputted from the control panel 240 to the controller 244 which in turn transmits a control signal dependent on the signal through the transmitter/receiver part 245 to the receiver 203.

In the receiver 203, the control signal transmitted from the transmitter/receiver part 245 of the remote controller 204 is received by the remote-controller-specific transmitter/receiver part 231 and outputted to the controller 232. In accordance with the control signal, the controller 232 causes the image processor 223 to zoom the video information outputted from the video and voice processor 222 to display the zoomed video on the display device 205. This allows the viewer to watch part of the displayed image which is freely zoomed in and out on the display device 205. The scroll and pause functions are similar in operation to the zoom function.

In the broadcast program transmitting/receiving system 200 constructed as described above, the broadcasting device 202 transmits to the receiver 203 the broadcasting waves which include the manual operation control information produced in accordance with the contents of the broadcast program and specifying the manual operation display items of the control panel 240 of the remote controller 204 in addition to the video information and the like about the broadcast program to be transmitted to the receiver 203. The receiver 203 outputs and displays the video information and the like transmitted from the broadcasting device 202 on the display device 205. The receiver 203 transmits to the remote controller 204 the manual operation control information transmitted with the video information and the like from the broadcasting device 202. The remote controller 204 changes the manual operation display item (or the button screen) of the control panel 240 based on the manual operation control information transmitted from the receiver 203, and controls the receiver 203 in response to the manual input operation inputted to the control panel 240 based on the changed manual operation display item. This allows changes in manual operation display items of the remote controller 204 depending on the contents of programs. Therefore, the broadcasting device 202 can offer a variety of services different depending on the contents of programs to the program viewers through the use of the manual operation display items of the remote controller 204 which vary depending on the contents of programs, without being limited to the single manual operation display item of the remote controller 204. The program viewers can select desired ones of the services offered by the broadcasting device 202 to access the services.

The remote controller 204 in this exemplary application may further have the function of magnifying the button screen displayed on the button display part 239*a*, and the function of scrolling into view a portion of the button screen on the button display part 239*a* which is hidden because of the magnification of the button screen. This magnifies the displayed buttons which have been small and hard-to-read, thereby to make the buttons easy-to-operate.

Figure 17:
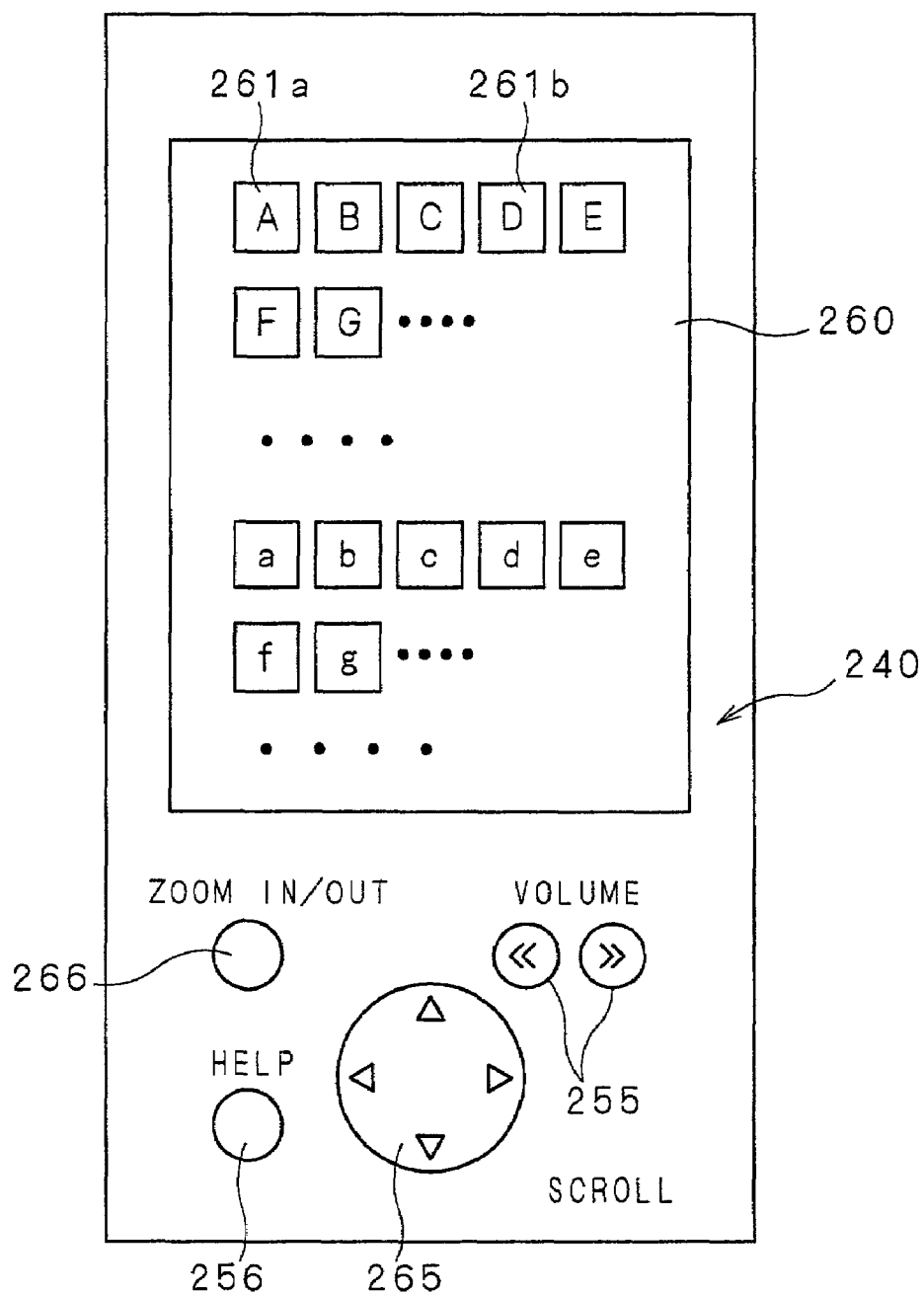
FIG. 17 shows an example of the remote controller having a zoom function and a scroll function for buttons.

FIG. 17 shows an exemplary remote controller 204A having such functions. In the remote controller 204A, a button screen 260 has uppercase and lowercase alphabetic characters 261*a*, 261*b*, . . . displayed on the control panel 240. The remote controller 204A comprises a zoom in/out button 266 for zooming in/out the button screen 260, and a crossed key 265 for scrolling.

Figure 18:
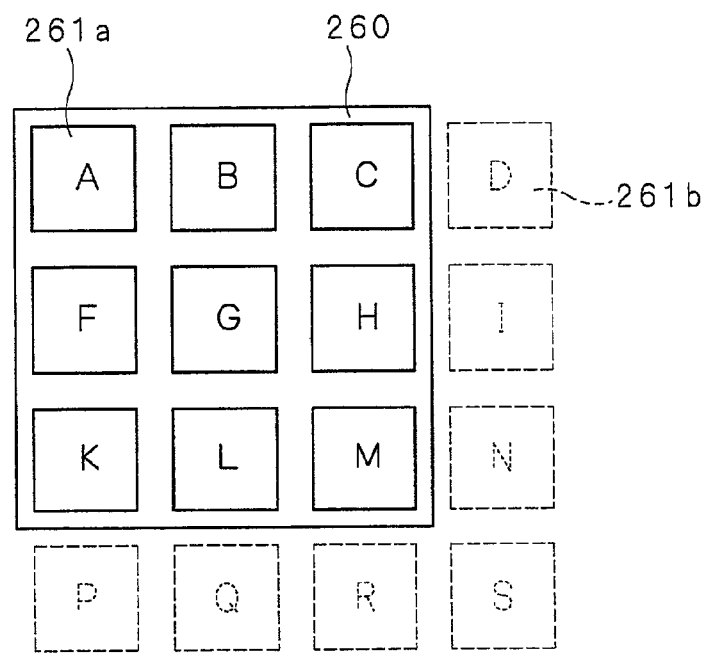
FIG. 18 shows an example of a button array as zoomed-in in the remote controller.
Figure 19:
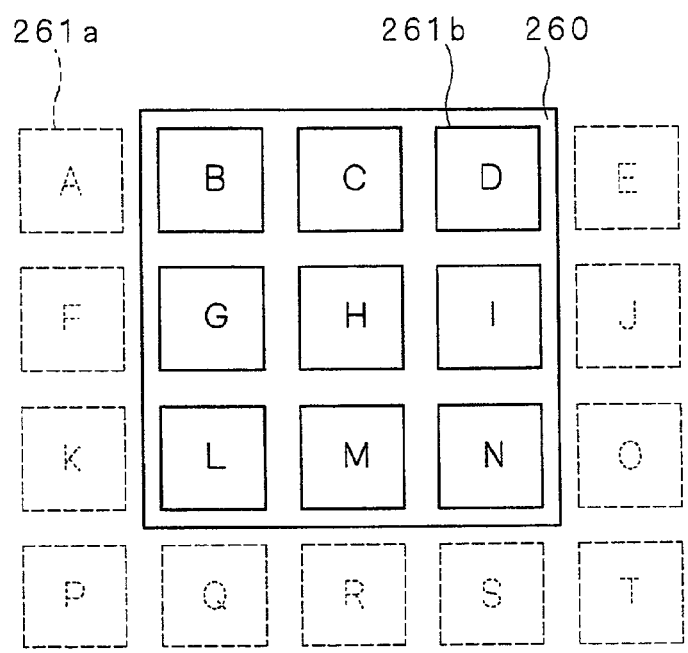
FIG. 19 shows an example of a button array as scrolled in the remote controller.

Pressing the zoom in/out button 266 magnifies a button image in the button screen 260 as shown in FIG. 18, but accordingly causes some alphabetic characters 261b to extend off the screen and disappear from sight. To operate a button area of the alphabetic characters 261b, the viewer presses the crossed key 265 shown in FIG. 17 to scroll the alphabetic characters 261b into view as shown in FIG. 19. Then, the viewer can perform a desired manual input operation by pressing a portion of the touch panel corresponding to the button area of the alphabetic characters 261b. Pressing the zoom in/out button 266 again returns the button screen 260 to its original state (shown in FIG. 17).

Figure 20:
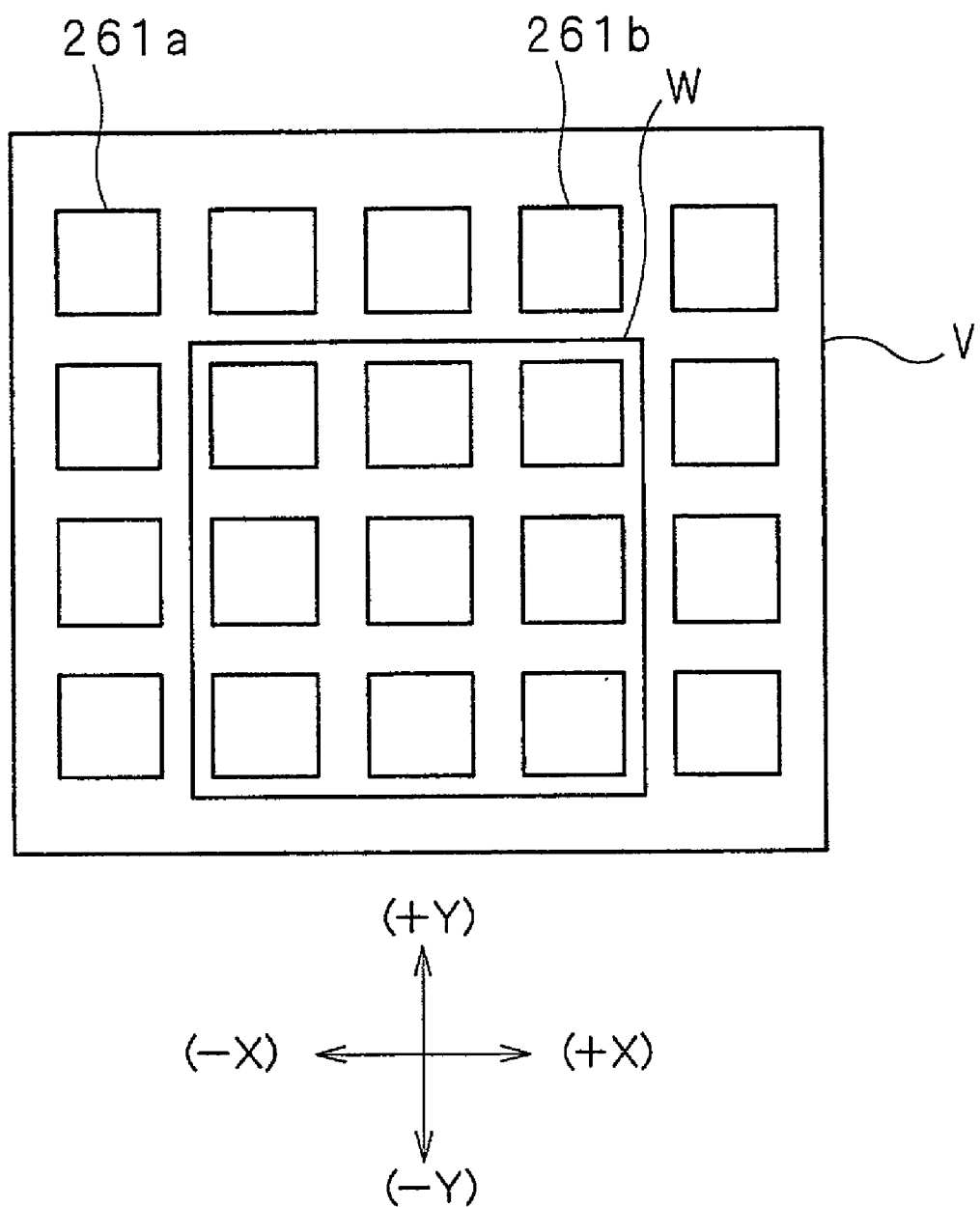
FIG. 20 shows an example of implementation of scrolling of a zoom image.

As illustrated in FIG. 20, such a remote controller 204A has an image memory area V corresponding to the number of pixels of the entire zoom image, and is configured to store the entire array of the zoom button images 261a, 261b, . . . in the image memory area V and to read only a window area W corresponding to the number of pixels of the button screen 260 to display the window area W on the button screen 260. Moving the window area W in +X, −X, +Y and −Y directions in response to the pressing of the crossed key 265 allows the desired part of the array of the zoom button images into view on the button screen 260 through a scroll operation.

Further, the remote controller 204 in this exemplary application may be adapted so that a user's manual operation from the remote controller 204 can change the constituents of the button screen displayed on the button display part 239a, such as the color of lines constituting button diagrams and characters.

Furthermore, the remote controller 204 in this exemplary application may be adapted so that the language displayed on the button display part 239a, e.g. the language displayed for explanation of the button functions, is selectable between a plurality of languages.

The control panel 240 of the remote controller 204 may be a control panel of a fixedly disposed push-button type. In this case, a display element, e.g. an LCD, for displaying the functions of the buttons is provided near the buttons or on an upper surface of each of the buttons (manual operation members) in order to display the functions of the buttons of the remote controller which vary depending on the contents of the broadcast programs.

Figure 21:
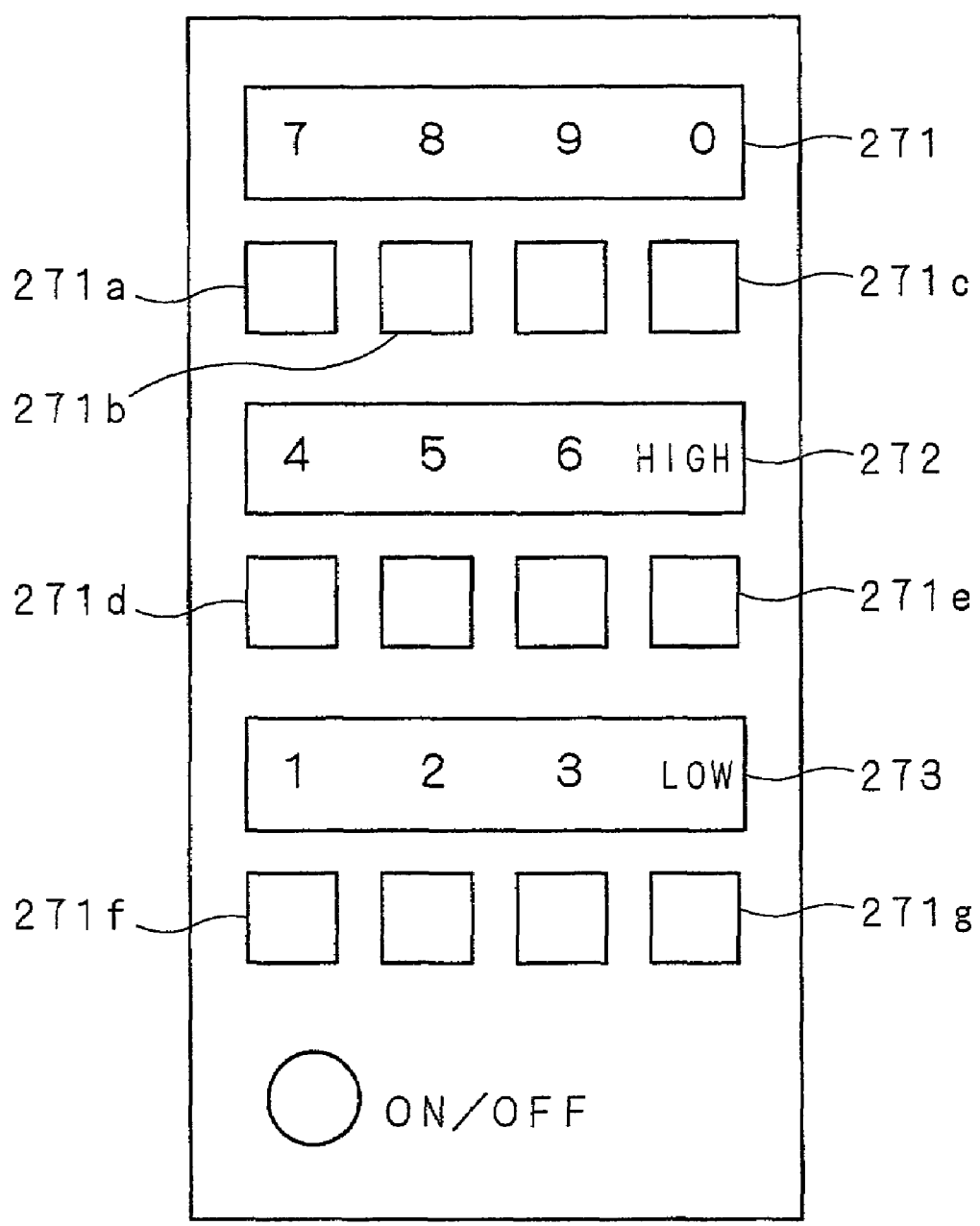
FIG. 21 shows an example of the remote controller including variable displays adjacent to push-buttons and capable of changing display items thereon in accordance with programs.

FIG. 21 shows an exemplary remote controller 204B which comprises push-buttons 271a to 271g serving as manual operation members fixedly arranged in a matrix, and button screens 271 to 273 arranged adjacent to respective rows of the push-buttons 271a to 271g. The button screen 271 in the first row variably displays the functions of four push-buttons 271a to 271c, and the button screen 272 in the second row variably displays the functions of the next four push-buttons 271d, 271e. The button screen 273 in the third row variably displays the functions of the next four push-buttons 271f, 271g. The variable display elements for displaying the button screen 271 to 273 are LCDs, and these button screens 271 to 273 produce variable displays in accordance with the manual operation control information dependent on the contents of the broadcast programs. A single LCD may be assigned to each of the buttons. This remote controller 204B requires no touch panel.

Although the switching between the button screens of the control panel 240 of the remote controller 204 is done automatically by the control panel display switching command signal transmitted from the broadcasting device 202 in this exemplary application, the viewer may manually operate the remote controller 204 to select between the button screens.

<2.3 Modifications of First Type>

Although the operation data which directly designates the details of operation of the peripheral devices 4A to 4G is included in the operation control information in the above-mentioned exemplary applications, the details of operation may be designated in an indirect manner to be describe below. Specifically, code numbers are assigned respectively to the operational details of the peripheral devices 4A to 4G (e.g., a code number "01" is assigned to dimming the illumination of the illumination device 4B), and an operation table specifying the assignment is previously stored in the receiver 3. Only the code numbers are designated in the operation control information included in the broadcasting waves from the broadcasting device 2. The receiver 3 discriminates between the operational details of the respective peripheral devices, based on the code numbers and the operation table, and transmits information about the operational details to the peripheral devices 4A to 4G, respectively.

The above-mentioned operations of the peripheral devices may be performed singly or in combination. This holds true for another preferred embodiment to be described later.

Although the first preferred embodiment is premised on the transmitting/receiving system for TV broadcasting, the present invention is also applicable to radio broadcasting in which the broadcasting waves include no video information.

Furthermore, the capabilities of the receiver 3 and the peripheral devices (personal computers and the like) may be incorporated in the single electronic unit known as the set-top box (STB).

Second Preferred Embodiment

A recording media player system will be described according to a second preferred embodiment of the present invention.

There are a variety of exemplary applications of the second preferred embodiment of the present invention. Description will be given first on a basic configuration of a the recording media player system, and thereafter on the various exemplary applications thereof.

<1 Basic Configuration of Recording Media Player System>

<1.1 Basic Construction of Recording Media Player System>

Figure 22:
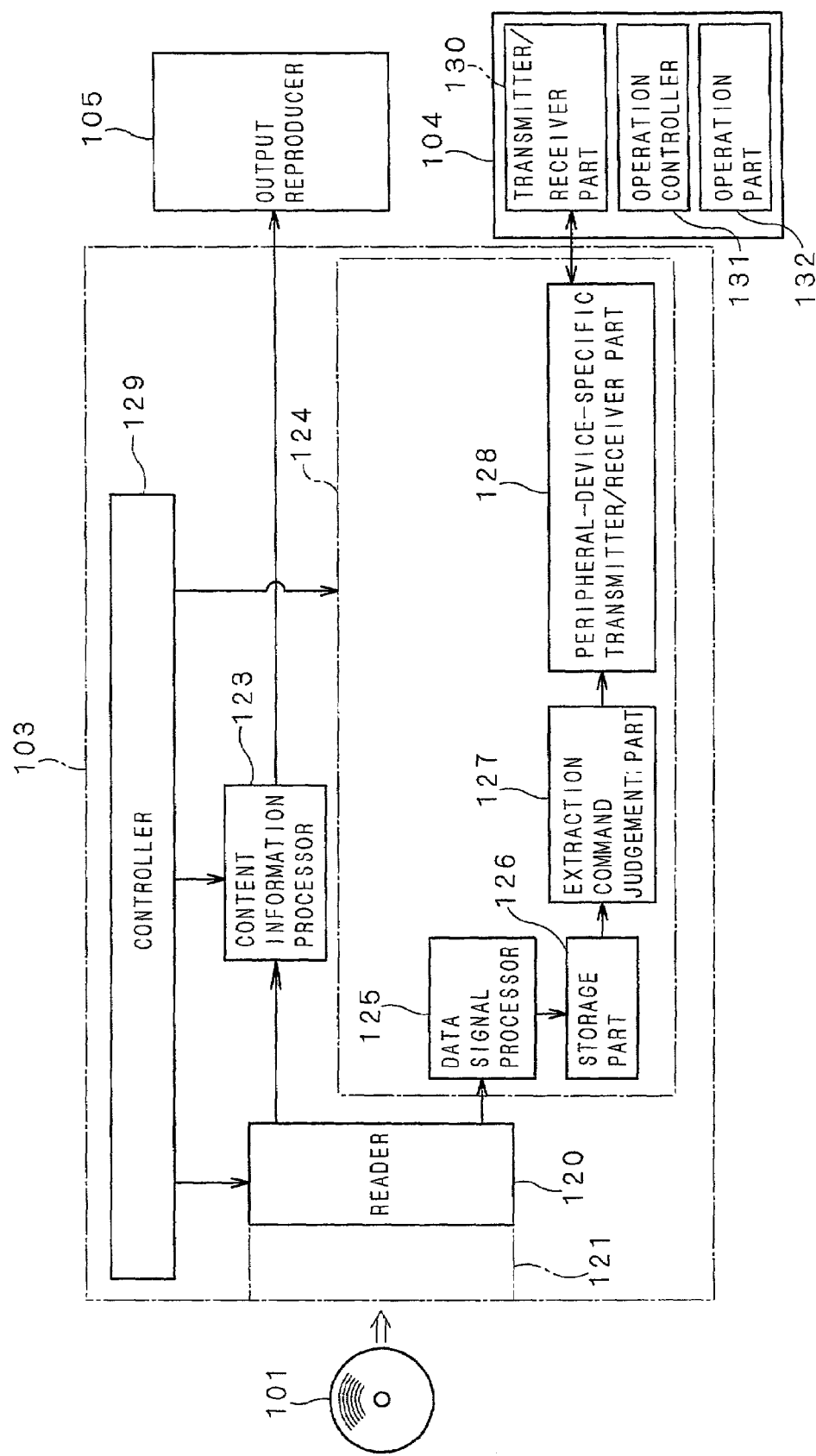
FIG. 22 is a block diagram of a recording media player system according to a second preferred embodiment of the present invention.

With reference to FIG. 22, the recording media player system is designed to accept a recording medium 101 such as a CD-ROM, and comprises a recording media player 103 for playing back the recording medium 101, and a peripheral device 104 placed in an environment (ordinary homes or the like) in which the recording media player 103 is used. When reproducing content information recorded on the recording medium 101, the recording media player system operates the peripheral device 104 in accordance with the details of the content.

<1.1.1 Recording Medium>

The recording medium 101 has content information recorded thereon in a predetermined data format, and operation control information for operating the peripheral device 104 in accordance with the details of the content which is also recorded thereon in a predetermined data format in association with the content information.

Examples of the recording medium 101 used herein may include compact discs (CD-ROM, CD-RAM, CD-R and CD-RW), digital versatile discs (DVD-ROM, DVD-RAM, DVD-video and the like), videotapes, magnetic disks (floppy disks and the like), magneto-optical disks (MO), memory cards, and the like all of which are transportable and capable of recording information through an electromagnetic process.

The above-mentioned content information includes, for example, voice information for music CDs, textual information and, as required, image and voice information for electronic books, and video and voice information and the like for DVD-ROMs.

<1.1.2 Recording Media Player>

The recording media player 103 is placed in ordinary homes, and reads content data recorded on the recording medium 101 to reproduce the content by means of a player device. The recording media player 103 is constructed as an electronic unit, for example, a CD player, an electronic book player, and a video player.

As shown in FIG. 22, the recording media player 103 has a slot 121 which can receive the recording medium 101. The recording media player 103 comprises a reader 120 for reading data recorded on the recording medium 101 inserted in the slot 121; a content information processor (output element) 123 for performing predetermined processing on content data included in the data read by the reader 120 to output the processed content data to an output reproducer 105; a transmission processor 124 for transmitting an operation command signal dependent on operation control data included in the data read by the reader 120 to the peripheral device 104; and a controller 129 for controlling the entire recording media player 103 including the transmission processor 124.

The reader 120 reads the data recorded on the recording medium 101 through an electromagnetic or optical process in accordance with a playback program. The reader 120 provides the content data included in the read data to the content information processor 123, and provides the operation control data corresponding to the content data to the transmission processor 124 almost simultaneously with the reading of the content data.

The content information processor 123 separates the data read by the reader 120, as required, into various data (voice data, image data, video data, textual data and the like), demodulates these data to recover original information (voice information, image information, video information, textual information and the like), and outputs the original information to the output reproducer 105. The output reproducer 105 is a device for reproducing the content information. Examples of the output reproducer 105 used herein include a display device for performing predetermined signal processing on the video information to display a video output on a built-in CRT or LCD panel, a loudspeaker device for amplifying the voice information to provide a voice output from a loudspeaker, and the like, depending upon the configurations of the present system. The output reproducer 105 may be integrated with the recording media player 103. For example, an electronic device in the form of an electronic book player comprises the function as the recording media player 103 and an LCD panel serving as the output reproducer 105 which are integrated together (See FIG. 25.).

Like the transmission processor 24 of the first preferred embodiment, the transmission processor 124 performs predetermined processing on the operation control data included in the data read by the reader 120 to transmit the processed operation control data to the peripheral device 104. The transmission processor 124 comprises a data signal processor 125, a storage part 126, an extraction command judgement part 127, and a peripheral-device-specific transmitter/receiver part 128, which correspond respectively to the data signal processor 25, the storage part 26, the extraction command judgement part 27 and the peripheral-device-specific transmitter/receiver part 28 in the first preferred embodiment and are not specifically described herein.

<1.1.3 Peripheral Device>

Examples of the peripheral device 104 include various devices which perform operations of some kind, such as an illumination device, a bodily sensation generating device (or a body-sonic generator), a cooking device and the like which are provided in ordinary homes in which the recording media player 103 is placed, except a device for reproducing content itself, such as the output reproducer 105. Like the peripheral device 4 of the first preferred embodiment, the peripheral device 104 typically comprises: an operation part 132 for performing a predetermined operation including controlling illumination, generating vibrations which cause bodily sensation, heating in cooking and the like; a transmitter/receiver part 130 capable of intercommunication with the peripheral-device-specific transmitter/receiver part 128 of the recording media player 103; and an operation controller 131 for controlling the operation of the operation part 132.

<1.2 Operation>

Operation of the recording media player system will be described below.

First, the recording medium 101 is provided on which the information about content and the operation control information dependent upon the details of the content are recorded. This recording medium 101 is packaged in the form of a music CD, a movie-recorded DVD or an electronic book distributed and available on the market.

The information including the content and the operation control information dependent upon the details of the content may be distributed from a server via networks including Internet, intranet, LAN, WAN and the like. Media for transmitting the information about the content and the operation control information may be either wired or wireless. Satellite communication may also be used to distribute the information about the content and the operation control information.

A system user (in ordinary homes) purchases the recording medium 101, inserts the recording medium 101 into the slot 121 of the recording media player 103, and causes the recording media player 103 to reproduce the content recorded on the recording medium 101.

Then, the recording media player 103 reads the data recorded on the recording medium 101 to provide the content data included in the recorded data to the content information processor 123.

The content data is separated into various data, as required, and demodulated to recover the original information which in turn is outputted to the output reproducer 105. Thus, the output reproducer 105 reproduces the content.

On the other hand, the operation control data included in the data recorded on the recording medium 101 is outputted to the data signal processor 125, and is demodulated by the data signal processor 125 to recover the original operation control information. The recovered operation control information is stored in the storage part 126.

The extraction command judgement part 127 extracts the operation control information from the storage part 126, and transmits a peripheral device operation command signal dependent on the operation control information through the peripheral-device-specific transmitter/receiver part 128 to the peripheral device 104.

Upon receipt of the peripheral device operation command signal, the transmitter/receiver part 130 of the peripheral device 104 provides the peripheral device operation command signal to the operation controller 131. Thus, the operation controller 131 controls the operation of the operation part 132 in response to the peripheral device operation command signal.

This allows the peripheral device 4 to perform an operation in accordance with the details of the content reproduced by the output reproducer 105.

The recording media player system constructed as described above comprises the recording medium 101 on which the content information and the operation control information for operating the peripheral device 104 in accordance with the details of the content are recorded, and the recording media player 103 which reads the data recorded on the recording medium 101 to output the content information to the output reproducer 105 and to transmit the operation command signal dependent on the operation control information to the peripheral device 104. The recording media player system causes the peripheral device 104 to operate in response to the operation command signal transmitted from the recording media player 103. Therefore, the recording media player system can operate the peripheral device 4 in accordance with the details of the content recorded on the recording medium 101.

<2. Exemplary Applications>

Description will be given on more specific applications of the recording media player system constructed as mentioned above.

<2.1 First Exemplary Application>

Figure 23:
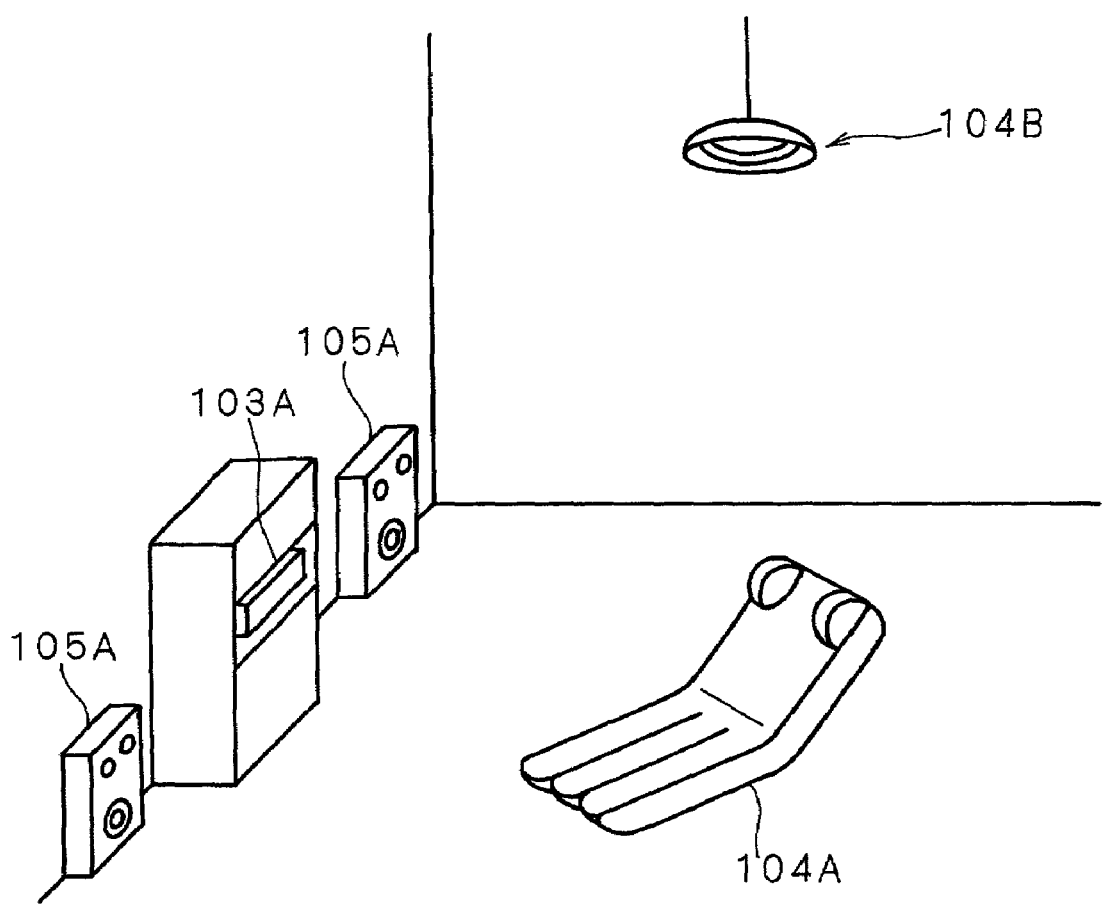
FIG. 23 is a perspective view of an exemplary application of the recording media player system.
Figure 24:
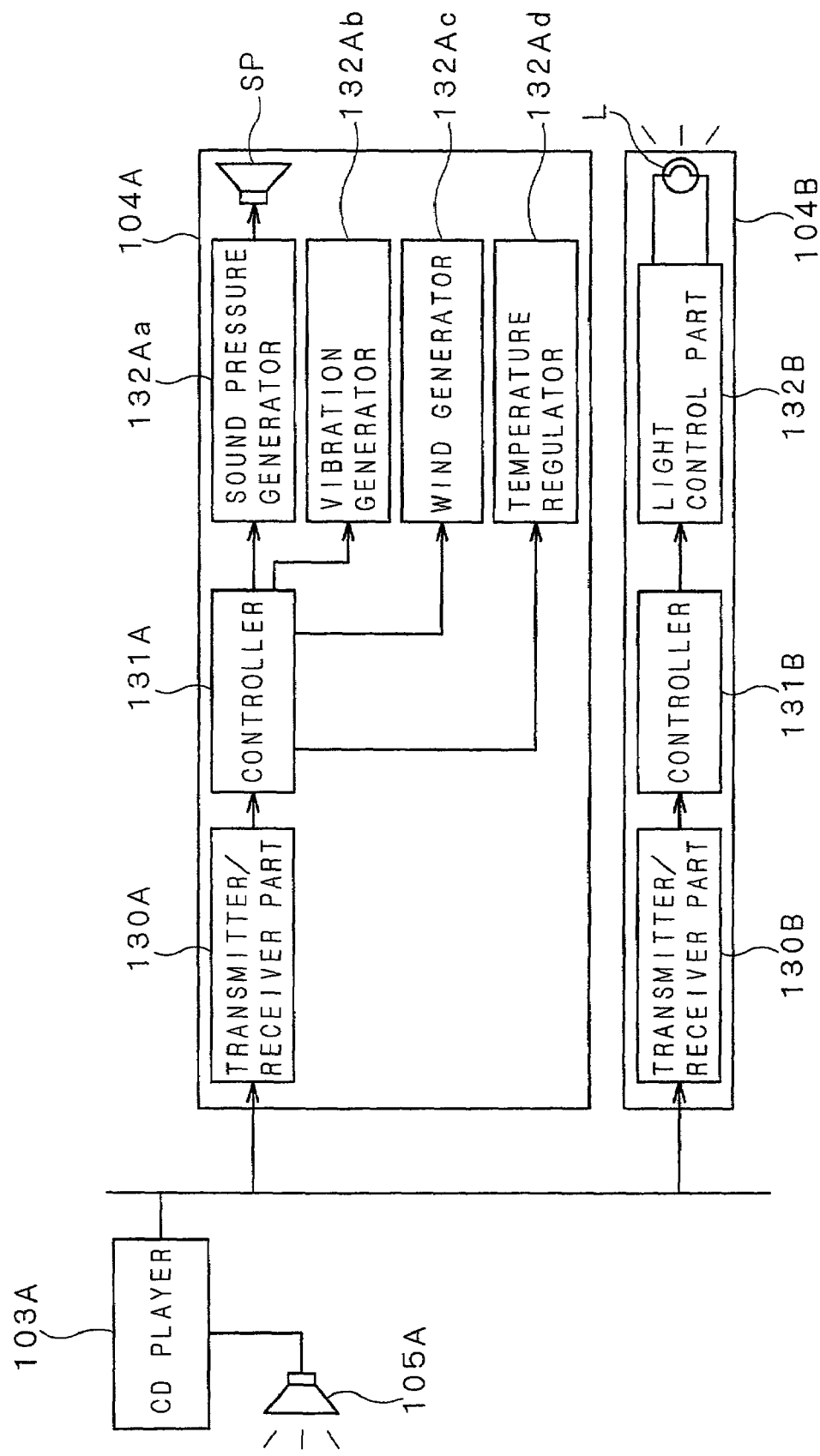
FIG. 24 is a block diagram of the exemplary application of the recording media player system of FIG. 23.

A first exemplary application is illustrated in FIGS. 23 and 24. A CD player 103A for CD-ROMs on which music information is recorded is used as the recording media player 103, and a bodily sensation generating device (known as a body-sonic generator) 104A and an illumination device 104B are used as the peripheral device 104.

In this case, in addition to the music information, body-sonic generator control information for operating the body-sonic generator 104A in synchronization with progress in reproducing music and illumination device control information for operating the illumination device 104B in synchronization with progress in reproducing music are recorded in time-division data formats on a CD-ROM serving as a recording medium. For example, the body-sonic generator control information includes data for vibrating the body-sonic generator 104A in rhythm with the music and for generating a sound pressure in a phrase wherein a bass voice or instrument is played.

The CD player 103A reads data recorded on the CD-ROM to output the music information included in the read data to loudspeakers 105A serving as the output reproducer 105, to transmit the body-sonic generator control information included in the read data to the body-sonic generator 104A, and to transmit the illumination device control information included in the read data to the illumination device 104B.

The body-sonic generator 104A has a body comprising a seat portion and a backrest portion. Incorporated in the body of the body-sonic generator 104A are a transmitter/receiver part 130A, a controller 131A, a sound pressure generator 132Aa, a vibration generator 132Ab, a wind generator 132Ac, and a temperature regulator 132Ad.

The sound pressure generator 132Aa generates a sound signal having a predetermined frequency, amplifies the sound signal, and outputs the amplified sound signal to a loudspeaker SP so that a user sitting in the body-sonic generator 104A physically feels the sound pressure of the sound having the predetermined frequency. The vibration generator 132Ab generates vibrations in the body of the body-sonic generator 104A by driving a motor or the like so that the user sitting in the body-sonic generator 104A physically feels the vibrations. The wind generator 132Ac turns a fan by driving a motor or the like to raise the wind so that the user sitting in the body-sonic generator 104A physically feels the pressure of the wind. The temperature regulator 132Ad generates heat by energizing a heater or the like to raise the temperature of the seat portion and the backrest portion of the body-sonic generator 104A so that the user sitting in the body-sonic generator 104A physically feels the warmness resulting from the raised temperature.

The illumination device 104B comprises a light control part 132B for controlling the brightness (or intensity) of a lamp L such as a fluorescent lamp; a transmitter/receiver part 130B capable of communicating with the CD player 103A, and a controller 131B for controlling the light control part 132B based on the illumination device control information received by the transmitter/receiver part 130B.

In the first exemplary application, the sound pressure generator 132Aa, the vibration generator 132Ab, the wind generator 132Ac and the temperature regulator 132Ad of the body-sonic generator 104A may be operated or the brightness of the lamp L of the illumination device 104B may be controlled according to the progress of the music outputted from the CD player 103A to the loudspeakers 105A and reproduced. Therefore, the user can enjoy the reproduced music more.

The illumination device 104B used herein may be of the type in which red, green and blue are combined to produce various colors, and may change the color of the illumination light in the room in accordance with the contents of the broadcast program. Then, the user can enjoy the music much more.

The first exemplary application may be similarly used when playing back a DVD-ROM on which live music video, a movie or the like is recorded by using a DVD player, in addition to the music CD.

<2.2 Second Exemplary Application>

Figure 25:
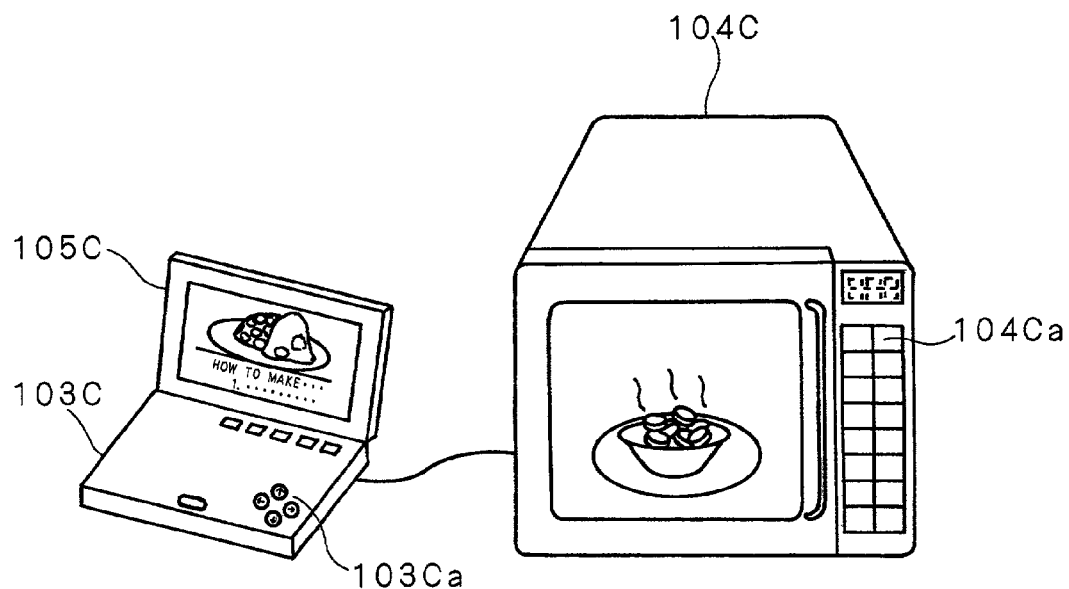
FIG. 25 is a perspective view of another exemplary application of the recording media player system.
Figure 26:
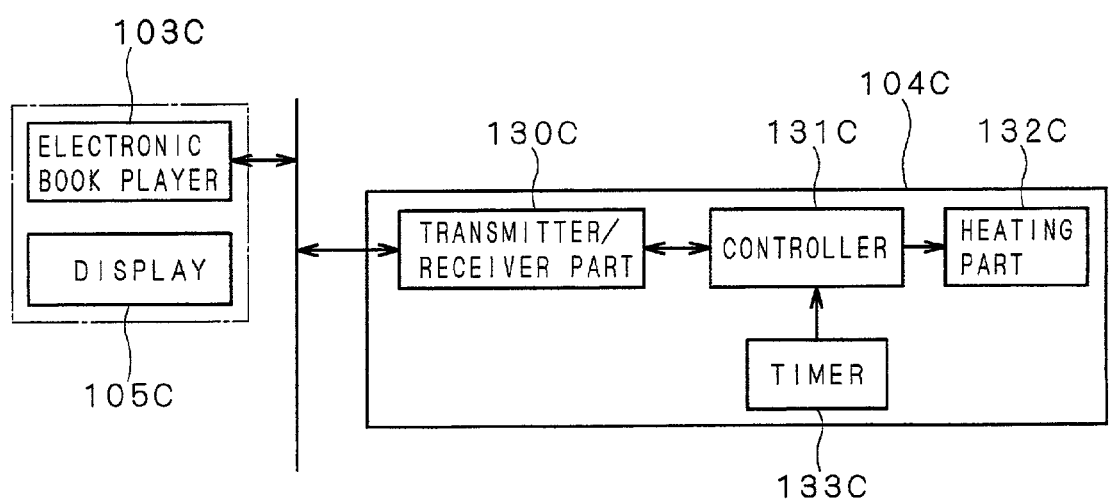
FIG. 26 is a block diagram of the exemplary application of the recording media player system of FIG. 25.

A second exemplary application shown in FIGS. 25 and 26 uses an electronic book player 103C having a display 105C as the recording media player 103, and uses a microwave oven 104C as the peripheral device 104.

In this case, content information including textual information and image information about how to cook, and cooking device control information for operating the microwave oven 104C according to progress in displaying a playback of the textual information are recorded on an electronic book (CD-ROM) serving as a recording medium. The textual information and the cooking device control information are in corresponding relation with each other. The electronic book player 103C is adapted to read the cooking device control information according to the progress in reproducing the textual information in accordance with a playback program to output a cooking device operation command signal dependent on the cooking device control information. The cooking device control information includes information about the heating power and time required to make carrots and potatoes in a boiled condition, for example, in the electronic book including information about how to cook a curry.

The electronic book player 103C reads the data recorded on the electronic book to display the textual information and the image information about how to cook on the display 105C while suitably causing the textual information and image information to proceed in response to the manual operation performed on an input part 103Ca, and to transmit to the microwave oven 104C the cooking device operation command signal dependent on the cooking device control information corresponding to the textual information and the image information about how to cook which are reproduced and displayed on the display 105C. For example, when reproducing and displaying a message such as "boil 100 g of potatoes" on the display 105C, the electronic book player 103C transmits information about the heating power and time required to boil 100 g of potatoes to the microwave oven 104C.

The microwave oven 104C comprises a heating part 132C for heating a recipe ingredient placed therein by an electromagnetic process; a transmitter/receiver part 130C for communicating with the electronic book player 103C to receive the cooking device operation command signal; and a controller 131C for controlling the heating part 132C based on the cooking device operation command signal provided from the transmitter/receiver part 130C and a clock signal provided from a timer 133C.

When the electronic book player 103C transmits the cooking device operation command signal to the microwave oven 104C, the transmitter/receiver part 130C receives the cooking device operation command signal to provide the cooking device operation command signal to the controller 131C. The controller 131C controls the heating part 132C based on the cooking device operation command signal. For example, when the electronic book player 103C transmits a signal (the cooking device operation command signal) about the heating power and time for a recipe ingredient (potatoes in the above-mentioned example) to the microwave oven 104C and the user places the recipe ingredient into the microwave oven 104C and presses a start button 104Ca, the microwave oven 104C heats the recipe ingredient (potatoes) placed therein in accordance with the heating power and time.

In the second exemplary application, the cooking device operation command signal is provided to the microwave oven 104C according to the progress in displaying a playback on the display 105C of the electronic book player 103C, and the operation of the microwave oven 104C is controlled in response to the cooking device operation command signal. Therefore, the user who views a playback display produced on the display 105C of the electronic book player 103C is required only to place a recipe ingredient into the microwave oven 104C and to press the start button 104Ca in order to precisely heat the recipe ingredient.

The microwave oven 104C can control the heating power stepwise, and the heating power and the like of the microwave oven 104C differ depending on the types of microwave ovens. The cooking device control information may include information about the amount of heat required to heat and cook the recipe ingredient, and the information about the heating power and the like may be transmitted from the microwave oven 104C for use in ordinary homes to the electronic book player 103C. Then, the electronic book player 103C may calculate the heating power and time suitable for the recipe ingredient, based on the information about the amount of heat to cook the recipe ingredient and the information about the heating power and the like of the microwave oven 104C, and then transmit the calculated heating power and time to the microwave oven 104C.

Although the microwave oven is used as a cooking device in the second exemplary application, the present invention is applicable to other gas and electric cookers capable of controlling the heating power and turning on/off the heat.

<2.3 Other Exemplary Applications>

The second preferred embodiment is also applicable when playing back a DVD-ROM on which a movie is recorded by the use of a DVD player, when playing back a CD-ROM other than a music CD, and playing back a videotape on which a movie, a drama, an animated cartoon or the like is recorded by the use of a video player.

Furthermore, general home electrical appliances such as an air conditioner, a telephone, and a toy may be used as the peripheral device 104, as in the first preferred embodiment.

While the invention has been described in detail, the foregoing description is in all aspects illustrative and not restrictive. It is understood that numerous other modifications and variations can be devised without departing from the scope of the invention.

What is claimed is:

1. A broadcasting system comprising a broadcasting device for transmitting broadcasting waves, a receiver for receiving said broadcasting waves, and a peripheral device provided outside said receiver;

said peripheral device including a remote controller for said receiver, said remote controller comprising a control panel having a display device;

said broadcast device comprising a transmission controller for transmitting a combination of broadcast data about a broadcast program and an external control signal for controlling said peripheral device in accordance with contents of said broadcast program in the form of said broadcasting waves to said receiver, said transmission controller comprising a clock element for clocking a broadcasting time of said broadcast program or elapsed time since start of broadcasting as a timing signal and a switching signal transmission element for transmitting a switching signal to said receiver, based on said timing signal, for displaying a display item on the control panel of said remote controller;

said receiver comprising a receiver controller for receiving said broadcasting waves from said broadcasting device to output said broadcast data to a reproducer and to transmit a command signal dependent on said external control signal, said receiver controller comprising a switching signal extraction element for extracting said switching signal from said broadcasting waves for a selected channel to transmit said switching signal to said remote controller; and said remote controller being controlled by said command signal and comprising a control element for displaying said display item dependent on said external control signal on said display device and for transmitting to said receiver an information signal responsive to an input operation to said control panel in accordance with said display item, said control element comprising a switching element for switching a first display item on said control panel to a second display item specified by said external control signal in response to said switching signal.

2. The system according to claim 1, wherein said command signal includes an operation object signal for indicating a display item of an operation object on said control panel and a response designation signal for designating a response of said remote controller to said input operation to said control panel in accordance with said display item.

3. The system according to claim 2, wherein said display item includes an image of a control button and said input operation to said control panel includes a manual operation of said control button.

4. The system according to claim 1, wherein said transmission controller comprises a multiplex element for multiplexing said broadcast data and said external control signal into said broadcasting waves for respective channels and a multiplex signal transmission element for transmitting said broadcasting waves for the respective channels to said receiver.

5. The system according to claim 1, wherein said switching signal is transmitted at regular intervals within a predetermined time period.

6. The system according to claim 1, wherein said peripheral device includes a toy device relating to a character and said external control signal includes information for operating said toy device in response to an operation of said character appearing in said broadcast program.

7. The system according to claim 1,
wherein said peripheral device includes a toy device relating to a character,
wherein said toy device comprises a voice storage, and
wherein said external control signal includes a voice signal representative of a voice emitted by said character appearing in said broadcast program and a storage command signal for instructing said toy device to store said voice signal in said voice storage.

* * * * *